United States Patent
Kagan et al.

(10) Patent No.: US 10,409,454 B2
(45) Date of Patent: Sep. 10, 2019

(54) SMART WATCH DEVICE AND USER INTERFACE THEREOF

(71) Applicant: Samsung Electronics Co., Ltd., Suwon-si, Gyeonggi-do (KR)

(72) Inventors: Tomer Kagan, Sunnyvale, CA (US); Liron Shapira, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 14/573,727

(22) Filed: Dec. 17, 2014

(65) Prior Publication Data

US 2015/0253885 A1   Sep. 10, 2015

Related U.S. Application Data

(60) Provisional application No. 61/948,488, filed on Mar. 5, 2014.

(51) Int. Cl.
  *G06F 3/0482*   (2013.01)
  *G06F 16/248*   (2019.01)
  (Continued)

(52) U.S. Cl.
  CPC .......... *G06F 3/0482* (2013.01); *G06F 1/163* (2013.01); *G06F 3/04842* (2013.01);
  (Continued)

(58) Field of Classification Search
  None
  See application file for complete search history.

(56) References Cited

U.S. PATENT DOCUMENTS

| | | | | |
|---|---|---|---|---|
| 7,286,063 | B2 * | 10/2007 | Gauthey | G06F 21/83 340/5.61 |
| 8,562,489 | B2 * | 10/2013 | Burton | G04F 10/00 482/1 |

(Continued)

FOREIGN PATENT DOCUMENTS

| | | |
|---|---|---|
| CN | 102483753 A | 5/2012 |
| CN | 103270510 A | 8/2013 |
| WO | WO-0148977 A2 | 7/2001 |

OTHER PUBLICATIONS

CaixaBank, "CaixaBank supports 'wearable banking' with the launch of application for SmartWatch and Google Glass devices," Feb. 19, 2014.

(Continued)

*Primary Examiner* — Patrice L Winder
*Assistant Examiner* — Angela M Widhlam de Rodrig
(74) *Attorney, Agent, or Firm* — Jefferson IP Law, LLP

(57) ABSTRACT

A smart watch device includes a wrist watch housing configured to be worn around a user's wrist, a computing device included in the housing, and a display device included in the housing and communicatively coupled to the computing device. The computing device is configured to transmit a search query to a search system and receive one or more search results from the search system in response to transmitting the search query. Each search result indicates a computing device function. The computing device is further configured to display only one of the search results using the display device, detect a user selection of the displayed search result, and transmit an indication of the user selection to a performing device. The performing device is configured to perform the function indicated by the displayed search result in response to receiving the indication.

20 Claims, 12 Drawing Sheets

(51) Int. Cl.

| | |
|---|---|
| *G06F 16/951* | (2019.01) |
| *G06F 16/957* | (2019.01) |
| *G06F 16/9537* | (2019.01) |
| *G06F 3/0484* | (2013.01) |
| *G06F 1/16* | (2006.01) |
| *G06F 3/0488* | (2013.01) |
| *H04L 29/08* | (2006.01) |

(52) U.S. Cl.
CPC .......... *G06F 16/248* (2019.01); *G06F 16/951* (2019.01); *G06F 16/957* (2019.01); *G06F 16/9537* (2019.01); *H04L 67/025* (2013.01); *G06F 3/04883* (2013.01)

(56) References Cited

U.S. PATENT DOCUMENTS

| | | | | |
|---|---|---|---|---|
| 8,725,842 | B1* | 5/2014 | Al-Nasser | G04G 17/08 |
| | | | | 367/11 |
| 8,781,791 | B2* | 7/2014 | Panther | G06F 3/011 |
| | | | | 702/160 |
| 8,964,947 | B1 | 2/2015 | Noolu et al. | |
| 9,092,400 | B1 | 7/2015 | Lin et al. | |
| 9,167,376 | B2* | 10/2015 | Holman | H04W 4/008 |
| 9,175,150 | B2* | 11/2015 | Rumpf | C09C 1/48 |
| 9,207,857 | B2* | 12/2015 | Snibbe | G06F 3/0488 |
| 9,245,282 | B2* | 1/2016 | Song | G06F 3/0481 |
| 9,317,155 | B2* | 4/2016 | Magi | G06F 3/0414 |
| 9,418,103 | B2* | 8/2016 | Shapira | G06F 17/30395 |
| 9,454,621 | B2* | 9/2016 | Angel | G06F 17/3097 |
| 9,495,456 | B2* | 11/2016 | Petersen | H04L 67/10 |
| 9,526,420 | B2* | 12/2016 | Fish | G08C 17/02 |
| 9,594,354 | B1* | 3/2017 | Kahn | G04G 21/00 |
| 9,720,672 | B2* | 8/2017 | Lipton | G06F 8/61 |
| 2002/0065802 | A1 | 5/2002 | Uchiyania | |
| 2008/0036586 | A1 | 2/2008 | Ohki | |
| 2008/0140779 | A1 | 6/2008 | Ahn et al. | |
| 2009/0012940 | A1 | 1/2009 | Ives et al. | |
| 2010/0293598 | A1 | 11/2010 | Collart et al. | |
| 2010/0306191 | A1 | 12/2010 | Lebeau et al. | |
| 2011/0045773 | A1 | 2/2011 | Yu et al. | |
| 2011/0099157 | A1 | 4/2011 | LeBeau et al. | |
| 2011/0153590 | A1 | 6/2011 | Chang et al. | |
| 2011/0275391 | A1 | 11/2011 | Lee et al. | |
| 2012/0042343 | A1 | 2/2012 | Laligand et al. | |
| 2012/0173520 | A1 | 7/2012 | Wu et al. | |
| 2012/0259930 | A1 | 10/2012 | Wu | |
| 2012/0282914 | A1 | 11/2012 | Alexander | |
| 2012/0289147 | A1 | 11/2012 | Raleigh et al. | |
| 2013/0065517 | A1 | 3/2013 | Svensson et al. | |
| 2013/0074117 | A1 | 3/2013 | Song et al. | |
| 2013/0170813 | A1 | 7/2013 | Woods et al. | |
| 2013/0176502 | A1 | 7/2013 | Nagata et al. | |
| 2013/0326502 | A1 | 12/2013 | Brunsman et al. | |
| 2014/0059494 | A1 | 2/2014 | Lee et al. | |
| 2014/0101535 | A1 | 4/2014 | Kim et al. | |
| 2014/0278839 | A1 | 9/2014 | Lynam et al. | |
| 2014/0335789 | A1 | 11/2014 | Cohen et al. | |
| 2014/0358910 | A1 | 12/2014 | Frigon et al. | |
| 2014/0359598 | A1 | 12/2014 | Oliver et al. | |
| 2014/0365462 | A1 | 12/2014 | Chang | |
| 2015/0046418 | A1* | 2/2015 | Akbacak | G06F 17/3002 |
| | | | | 707/706 |
| 2015/0073907 | A1* | 3/2015 | Purves | G06Q 20/32 |
| | | | | 705/14.58 |
| 2015/0098309 | A1* | 4/2015 | Adams | G04G 9/0064 |
| | | | | 368/10 |
| 2015/0160622 | A1* | 6/2015 | Kim | G04G 21/02 |
| | | | | 368/9 |
| 2015/0170249 | A1 | 6/2015 | Cockcroft | |
| 2015/0230022 | A1* | 8/2015 | Sakai | H04R 1/1041 |
| | | | | 381/58 |
| 2015/0254258 | A1 | 9/2015 | Kagan et al. | |
| 2015/0254351 | A1 | 9/2015 | Kagan et al. | |
| 2015/0254352 | A1 | 9/2015 | Kagan et al. | |
| 2015/0254367 | A1 | 9/2015 | Kagan et al. | |
| 2016/0019360 | A1* | 1/2016 | Pahwa | G06F 19/3418 |
| | | | | 705/3 |
| 2016/0188681 | A1 | 6/2016 | Savliwala et al. | |
| 2016/0316363 | A1* | 10/2016 | Li | H04W 12/04 |
| 2016/0358629 | A1* | 12/2016 | Pribula | H04N 21/43615 |
| 2017/0011210 | A1* | 1/2017 | Cheong | H04W 12/06 |

OTHER PUBLICATIONS

Doblygoskl, "How to Set the Default Apps in Android", Mar. 8, 2013.
International Search Report and Written Opinion for WO Application No. PCT/US2015/018950 dated Jun. 1, 2015.
International Search Report and Written Opinion for related WO Application Serial PCT/US2015/067850, dated Apr. 29, 2016.
Kin Dong et al., "Similarity Search for Web Services", Proceedings 2004 VLDB Conference, Aug. 31, 2004, pp. 372-383, XP055148410.
Ryan R Lee et al., "Schema for Representing CORBA Object References in an LDAP Directory; rfc2714.txt", Network Working Group RFC 1717, Internet Society (ISOC), Geneva, Switzerland, Oct. 31, 1999, pp. 1-2, XP015008497.
Chinese Office Action dated Mar. 25, 2019, issued in Chinese Patent Application No. 201580022904.7.
U.S. Appl. No. 14/575,213, filed Dec. 18, 2014, Tomer Kagan.
U.S. Appl. No. 14/575,323, filed Dec. 18, 2014, Tomer Kagan.
U.S. Appl. No. 14/577,602, filed Dec. 19, 2014, Tomer Kagan.
U.S. Appl. No. 14/577,800, filed Dec. 19, 2014, Tomer Kaftan.
U.S. Appl. No. 14/876,617, filed Oct. 6, 2015, Taher Savliwala.

* cited by examiner

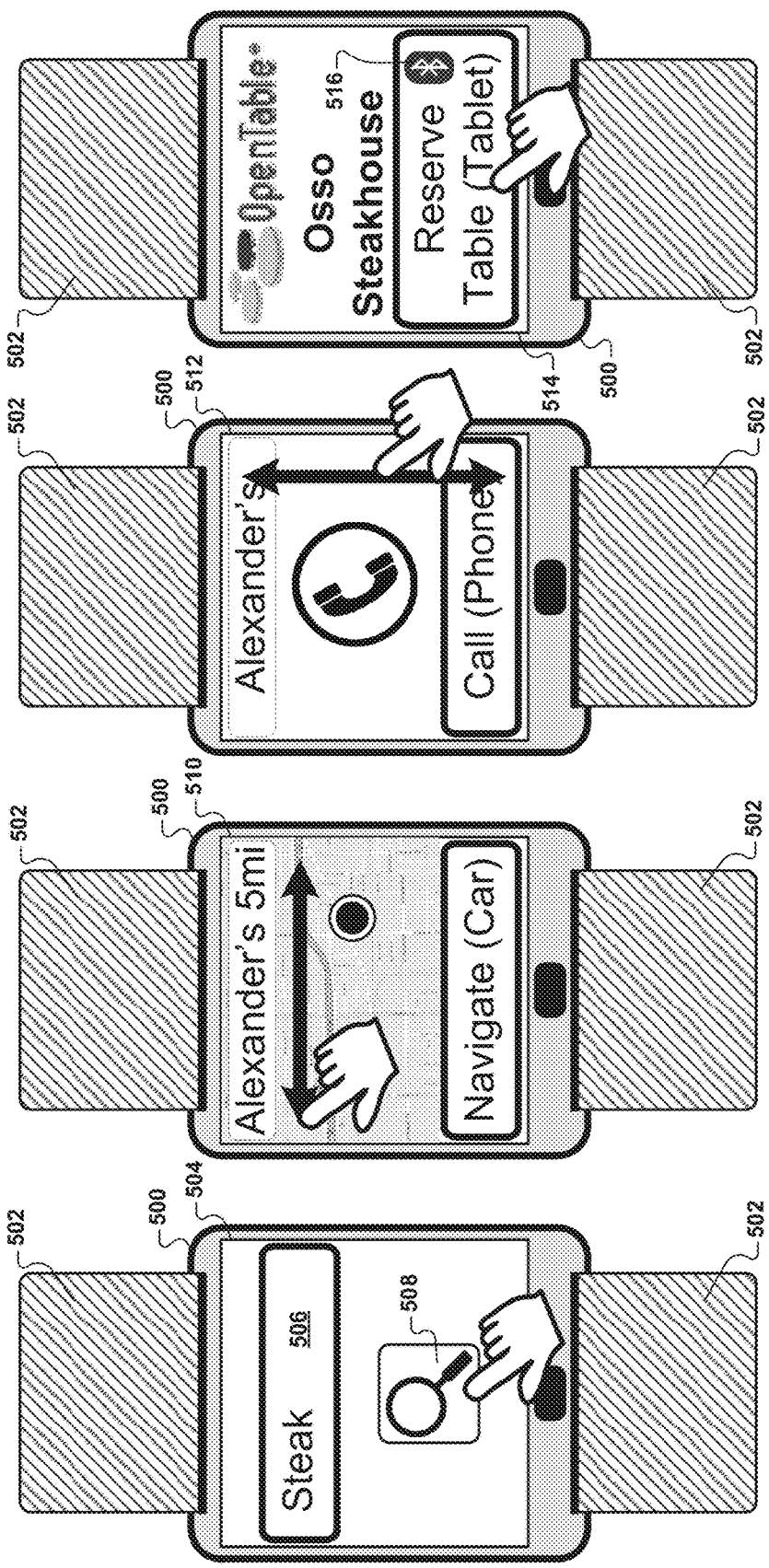

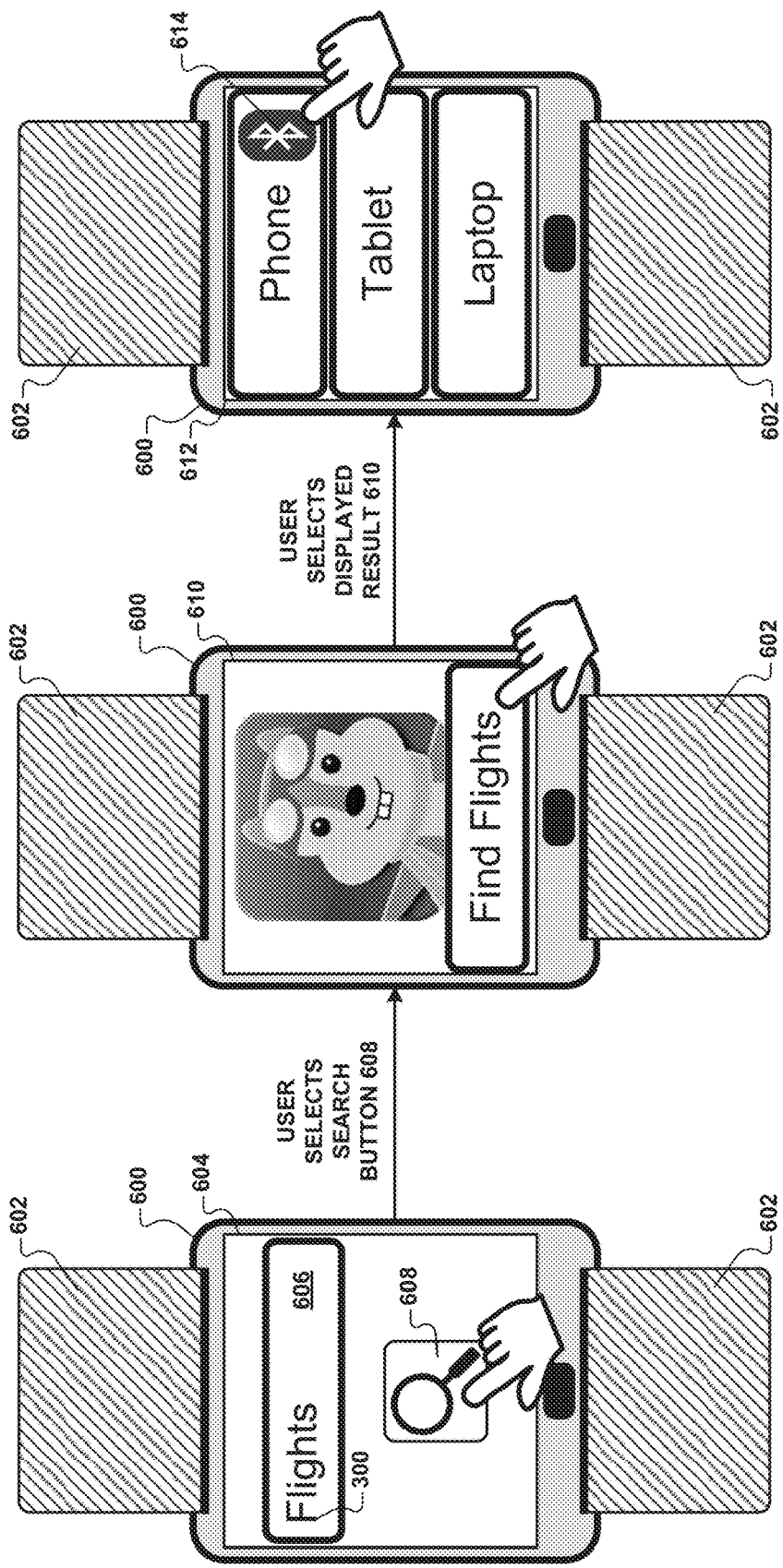

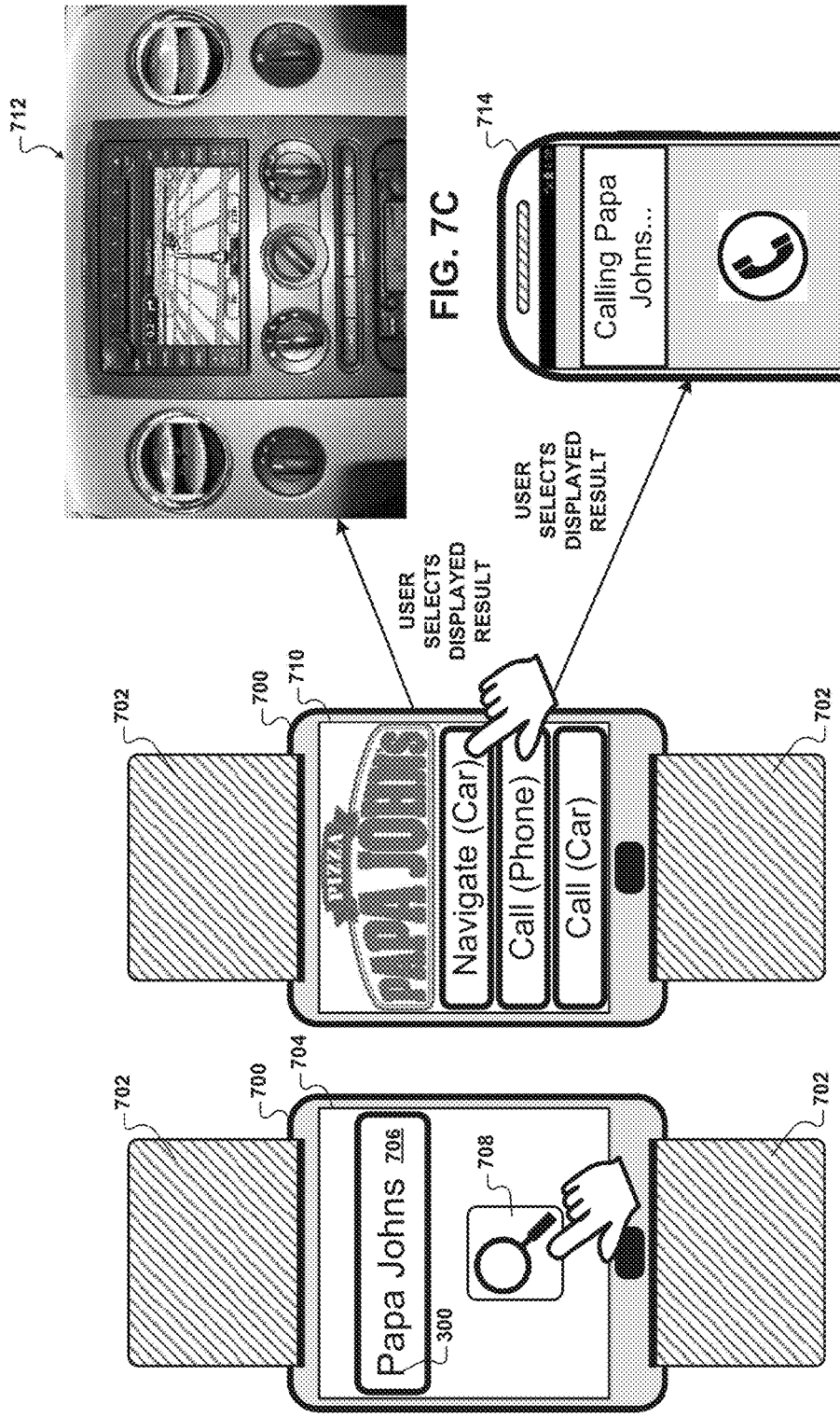

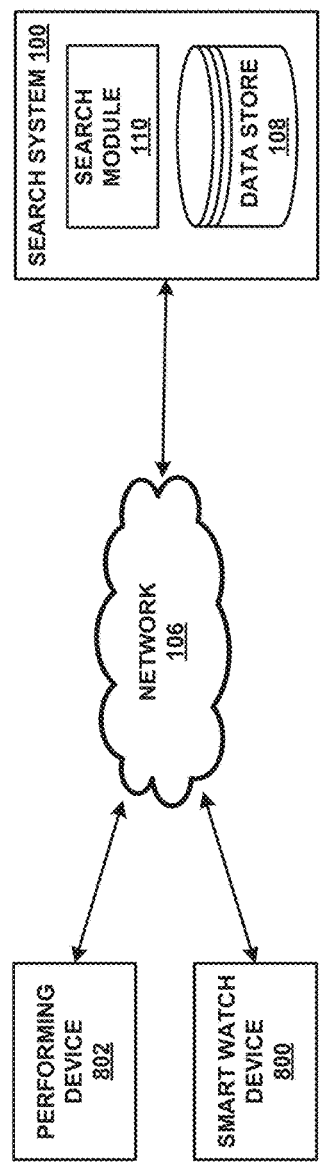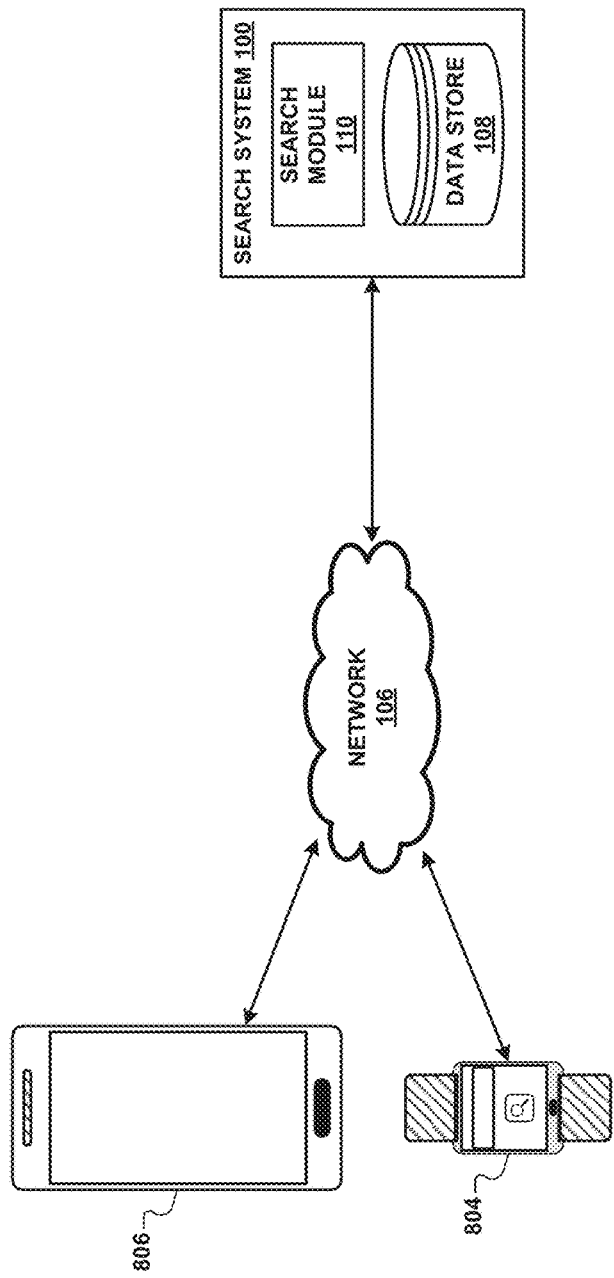

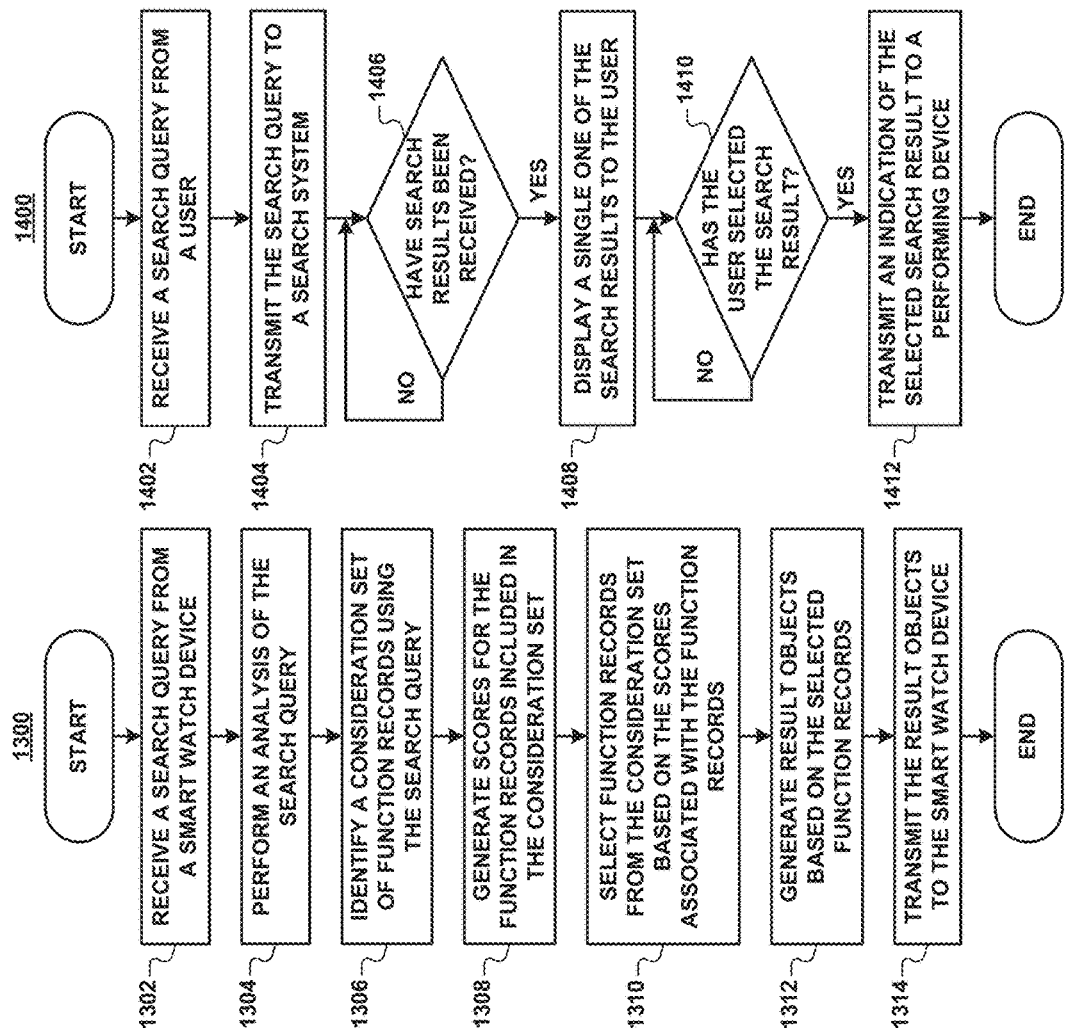

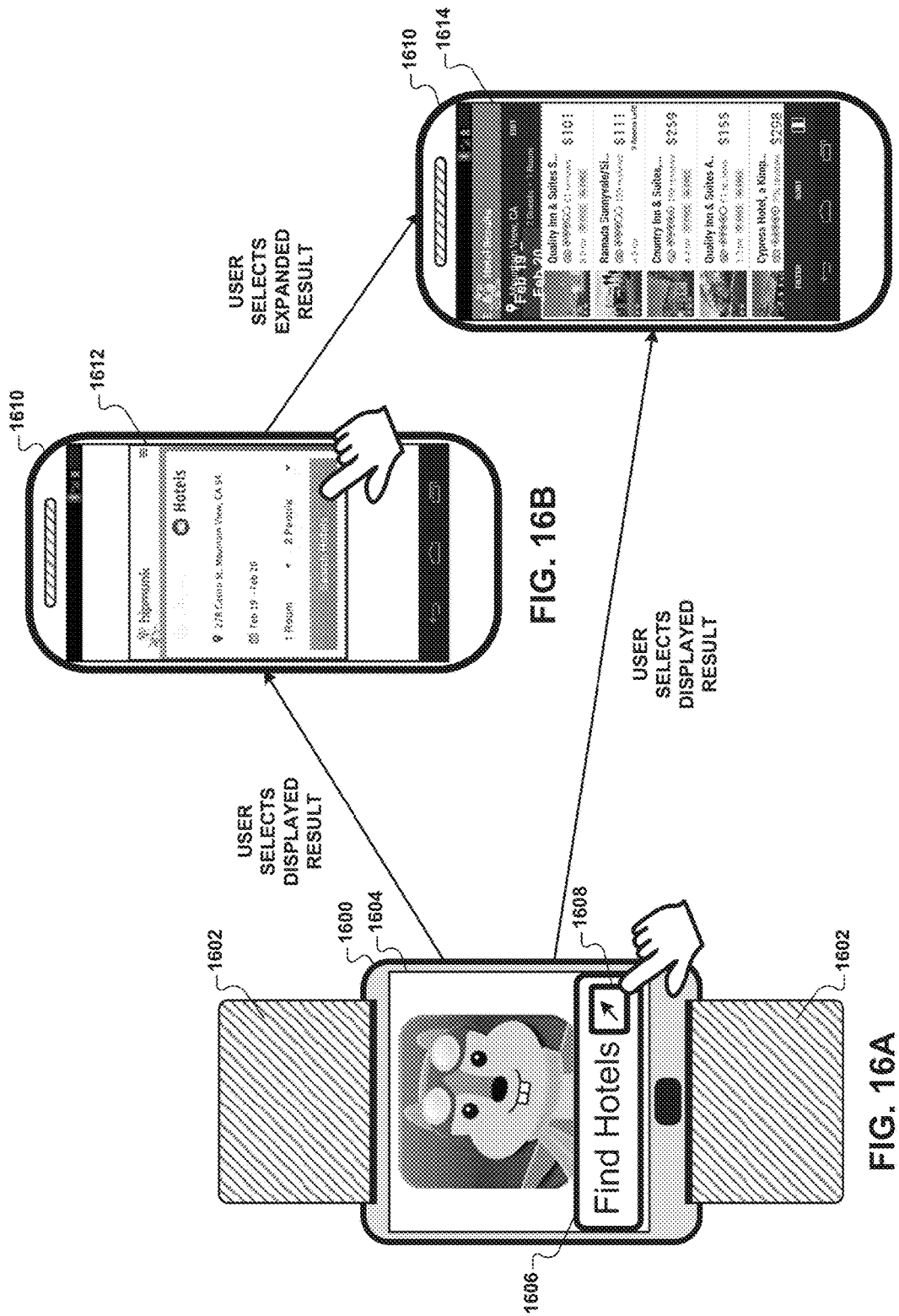

SMART WATCH DEVICE AND USER INTERFACE THEREOF

CROSS-REFERENCE TO RELATED APPLICATION

This application claims the benefit of U.S. Provisional Application No. 61/948,488 filed Mar. 5, 2014, which is hereby incorporated by reference in its entirety.

TECHNICAL FIELD

This disclosure generally relates to the field of search, and more particularly to wearable computing devices for generating, displaying, and accessing search results.

BACKGROUND

In recent years, the use of computers, smart phones, and other Internet-connected computing devices has grown significantly. Correspondingly, the number of software applications available for such computing devices has also grown. Today, many diverse software applications can be accessed on a number of different computing devices, including, but not limited to, smart phones, personal computers, automobiles, and televisions. These software applications can include business driven applications, games, educational applications, news applications, shopping applications, messaging applications, media streaming applications, and social networking applications, as some examples. Because of the large number of software applications available today and the wide range of functionality they provide, computing device users often require the ability to search for and access specific software application functionality.

SUMMARY

In one example, a smart watch device includes a wrist watch housing configured to be worn around a user's wrist, a computing device included in the wrist watch housing, and a display device included in the wrist watch housing and communicatively coupled to the computing device. The computing device is configured to transmit a search query to a search system configured to generate search results in response to a received search query, and receive one or more search results from the search system in response to transmitting the search query. In this example, each search result indicates a computing device function. The computing device is further configured to display only one of the one or more search results at the display device, detect a user selection of the one of the one or more search results, and transmit an indication of the user selection to a performing device. In this example, the performing device is configured to perform the function indicated by the one of the one or more search results in response to receiving the indication.

In another example, a method includes transmitting, using a smart watch device, a search query to a search system configured to generate search results in response to a received search query, and receiving one or more search results from the search system in response to transmitting the search query at the wrist watch device. In this example, each search result indicates a computing device function. The method further includes displaying only one of the one or more search results at the wrist watch device, detecting, using the wrist watch device, a user selection of the one of the one or more search results, and transmitting, using the wrist watch device, an indication of the user selection to a performing device. In this example, the performing device is configured to perform the function indicated by the one of the one or more search results in response to receiving the indication.

In another example, a non-transitory computer-readable storage medium includes instructions that cause one or more computing devices to transmit, using a wrist watch device, a search query to a search system configured to generate search results in response to a received search query, and receive one or more search results from the search system in response to transmitting the search query at the wrist watch device. In this example, each search result indicates a computing device function. The instructions further cause the one or more computing devices to display only one of the one or more search results at the wrist watch device, detect, using the wrist watch device, a user selection of the one of the one or more search results, and transmit, using the wrist watch device, an indication of the user selection to a performing device. In this example, the performing device is configured to perform the function indicated by the one of the one or more search results in response to receiving the indication.

BRIEF DESCRIPTION OF DRAWINGS

The details of one or more examples are set forth in the accompanying drawings and the description below. Other features, objects, and advantages will be apparent from the description and drawings, and from the claims.

FIGS. 5A-5D illustrate example graphical user interfaces (GUIs) that may be generated on a smart watch device according to the present disclosure.

FIGS. 6A-6C illustrate other example GUIs that may be generated on a smart watch device according to the present disclosure.

FIGS. 7A-7D illustrate example GUIs that may be generated on a smart watch device and a performing device according to the present disclosure.

FIGS. 8A-9B illustrate example arrangements of a smart watch device and a performing device in communication with a search system via a network.

FIG. 13 is a flow diagram that illustrates an example method for performing a search for function records based on a received search query.

FIG. 14 is a flow diagram that illustrates an example method describing operation of a smart watch device.

FIG. 15 is a flow diagram that illustrates an example method describing operation of a performing device.

FIGS. 16A-16C illustrate other example GUIs that may be generated on a smart watch device and a performing device according to the present disclosure.

DETAILED DESCRIPTION

Figure 1:
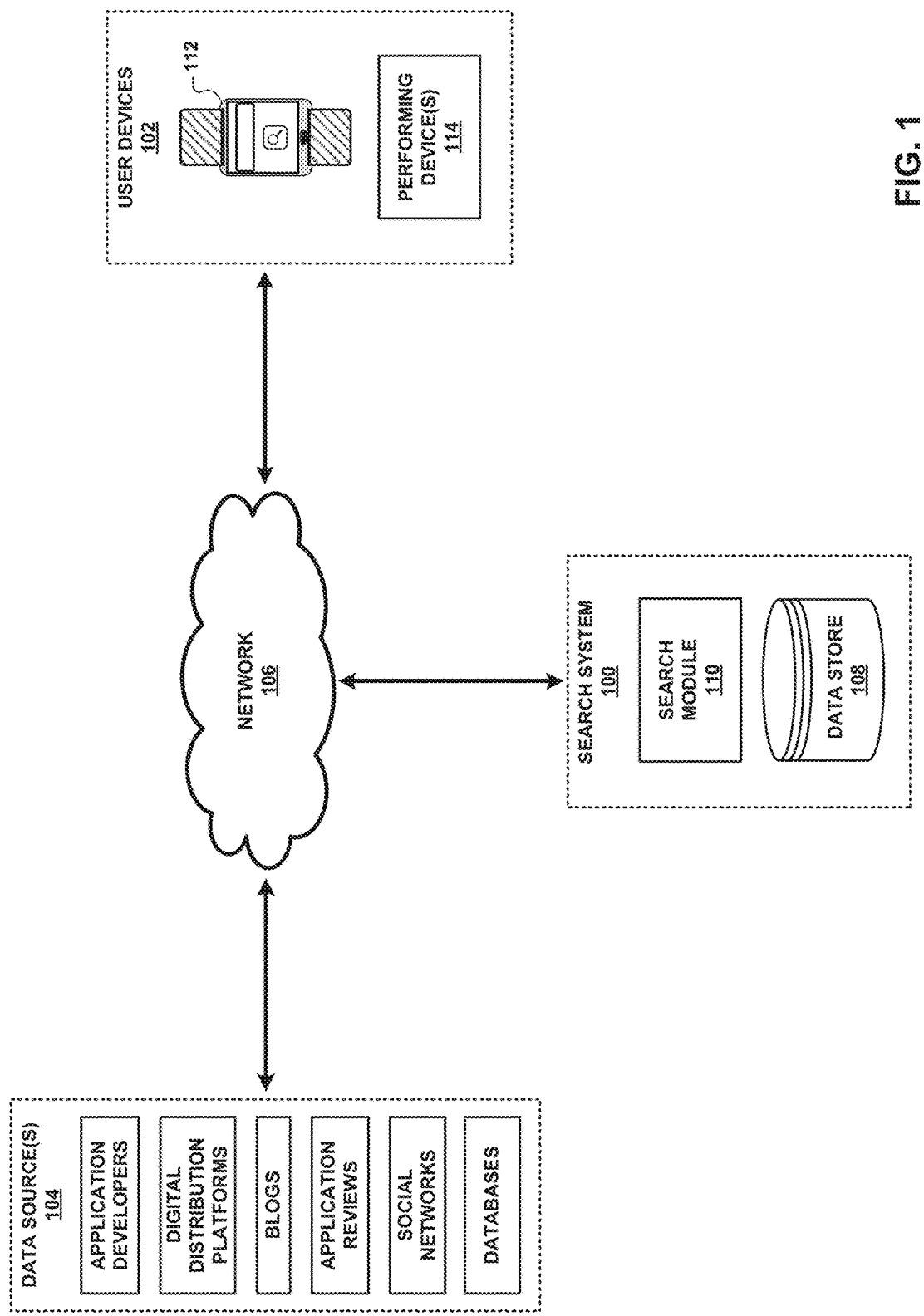
FIG. 1 illustrates an example environment that includes a smart watch device, one or more performing devices, and a search system.

The figures and the following description relate to example implementations by way of illustration only. It should be noted that from the following discussion, alternative implementations of the structures and methods disclosed herein will be readily recognized as viable alternatives that may be employed without departing from the scope of the disclosure.

The present disclosure generally relates to the field of search, and, more particularly, to wearable computing devices used to generate, display, and access search results. Specifically, the techniques of this disclosure are directed to a smart watch device and a user interface (UI) thereof. The smart watch device and the UI of this disclosure may enable a user to perform a search for software applications using the smart watch device, and cause a different device (e.g., a "performing device") to perform functions indicated by search results generated as part of the search. According to the techniques disclosed herein, the smart watch device may transmit a search query to a search system configured to generate search results in response to a received search query. For example, the smart watch device may receive the search query from a user of the smart watch device. The smart watch device may subsequently receive search results from the search system in response to transmitting the search query. In this example, each search result may indicate a function for a computing device (e.g., the performing device) to perform. For instance, each search result may include an access mechanism that, upon being received by a computing device, causes the computing device to set a software application included on the computing device into a particular application state. Upon receiving the search results, the smart watch device may display a single one of the received search results to the user at any given time. The smart watch device may display the single search result on a display of the smart watch device, e.g., using the entirety of the display in cases where the display is relatively small in size. The smart watch device may further detect a selection of the displayed search result by the user, and transmit an indication of the selection to the performing device. The indication may include one or more instructions or commands for the performing device. The performing device may be configured to perform the function indicated by the selected search result in response to receiving the indication. For example, the performing device may be configured to set a software application installed on the performing device into a particular application state using an access mechanism included in the selected search result, as described above.

A software application, as described herein, may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices, such as smart phones, tablets, and wearable computing devices (e.g., headsets and/or watches, such as so-called "smart watches"). Applications can also be executed on other types of computing devices having other form factors, such as laptop computers, desktop computers, computing devices that are installed in vehicles (e.g., so-called "vehicle navigation systems"), and other consumer electronic devices. In some examples, applications may be installed on a computing device prior to a user purchasing the computing device. In other examples, the user may download and install applications on the computing device after purchasing the computing device.

The functionality of an application may be accessed on the computing device on which the application is installed. Additionally, or alternatively, the functionality of an application may be accessed via a remote computing device. In some examples, all of an application's functionality may be included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web-based application) may be partially executed by the user's computing device and partially executed by a remote computing device. For example, a web-based application may be an application that is executed, at least in part, by a web server and accessed by a web browser of the user's computing device. Example web-based applications may include, but are not limited to, web-based email, online auctions, and online retail sites.

As described above, the present disclosure is directed to a smart watch device configured to generate search results using a search query received from a user, and display a single one of the generated search results on the smart watch device (e.g., on a display of the smart watch device) at any given time. The smart watch device is further configured to, upon the user selecting a particular displayed search result on the smart watch device, cause a second computing device, which may be referred to herein as a "performing device," to perform one or more operations, or functions, indicated by the selected search result. For example, the performing device may set an application installed on the performing device into a specific application state using data included in, or associated with, the selected search result. In some examples, the user may be in proximity to (e.g., nearby) the smart watch device and the performing device. In other examples, the computing device generating the search results and displaying a single one of the generated search results may be another type of wearable computing device other than a smart watch device (e.g., a headset computing device, such as so-called "smart glasses," or another device, such as so-called "smart contact lenses"). For example, the computing device may be any computing device that includes a display that has a relatively small size. Additionally, in some examples, the performing device may be a mobile computing device (e.g., a smart phone in the user's pocket, or a tablet in the user's palm), or another type of computing device located in proximity to the user (e.g., a vehicle navigation system installed in the user's vehicle, or a television or personal computer present in the user's home).

The present disclosure also describes features of a UI of the smart watch device that may enable the user to interact with the generated search results on the smart watch device in a number of ways. In some examples, the smart watch device may detect a user input configured to cause the smart watch device to navigate through the search results. In these examples, the smart watch device may display a different one of the search results using the display of the smart watch device in response to detecting the user input. In some examples, to detect the user input, the smart watch device may detect a right swiping gesture and/or a left swiping gesture at the display. In these examples, assuming the displayed search result is associated with a particular application (e.g., a native application, or a web-based application), to display the different one of the search results, the smart watch device may display one of the search results that is associated with the same application. Alternatively, in other examples, to detect the user input, the smart watch device may detect an upward swiping gesture and/or a downward swiping gesture at the display. In these examples, assuming the displayed search result is associated with a first application, to display the different one of the search results, the smart watch device may display one of the search results that is associated with a second application that is different than the first application. In other examples, the smart watch device may display different ones of the search results upon detecting other gestures at the display and/or one or more buttons of the smart watch device.

In some examples, the smart watch device may store the search results within (e.g., a memory device of) the smart watch device and/or within an external a data store. In these examples, the smart watch device may receive a user input configured to cause the smart watch device to display the stored search results using the display, and display one of the stored search results using the display in response to receiving the user input. In these examples, the smart watch device may further detect a user input configured to cause the smart watch device to navigate through the stored search results, and display a different one of the stored search results using the display in response to detecting the user input.

In other examples, the smart watch device may display an indication of the performing device using the display of the smart watch device. For example, the smart watch device may display an indication of one or more of the following using the display: (1) whether the performing device is communicatively coupled to the smart watch device; (2) whether the performing device has been previously communicatively coupled to the smart watch device; (3) a communication interface by which the performing device is communicatively coupled to the smart watch device; (4) a location of the performing device; and (5) availability of the performing device to perform the function indicated by the selected search result.

In some examples, to transmit the indication of the user selection to the performing device, the smart watch device may display indications of one or more performing devices, including the performing device, using the display of the smart watch device. The smart watch device may detect a user selection of one of the indications that corresponds to the performing device, and select the performing device from among the performing devices in response to detecting the user selection. In these examples, each of the performing devices may be a performing device that is capable of performing the function indicated by the selected search result in response to receiving the indication. Each performing device may also be a performing device that is communicatively coupled to the smart watch device, a performing device that has been previously communicatively coupled to the smart watch device, a performing device that is located proximate to (e.g., nearby) the smart watch device, and/or a performing device that is available to perform the function indicated by the selected search result. In some examples, the smart watch device may display the indications using the display along with the displayed search result also displayed using the display. Alternatively, in other examples, the smart watch device may display the indications using the display after detecting the user selection of the displayed search result. For example, the smart watch device may display the indications in place of the displayed search result that has been displayed using the display.

In some examples, to display the indications using the display, the smart watch device may arrange at least one of the indications based on one or more of the following considerations: (1) whether the corresponding one of the performing devices is communicatively coupled to the smart watch device; (2) whether the corresponding one of the performing devices has been previously communicatively coupled to the smart watch device; (3) whether the corresponding one of the performing devices is located proximate to the smart watch device; (4) whether the corresponding one of the performing devices is available to perform the function indicated by the selected search result; (5) a number of times the corresponding one of the performing devices has been previously selected from among one or more performing devices; and (6) how frequently the corresponding one of the performing devices has been selected from among one or more performing devices. In other examples, the smart watch device may also display indications of one or more of the following using the display (e.g., along with the indications of the performing devices): (1) whether at least one of the performing devices is communicatively coupled to the smart watch device; (2) whether at least one of the performing devices has been previously communicatively coupled to the smart watch device; (3) a communication interface by which at least one of the performing devices is communicatively coupled to the smart watch device; (4) a location of at least one of the performing devices; and (5) availability of at least one of the performing devices to perform the function indicated by the selected search result.

In some examples, the displayed search result may indicate multiple functions for a computing device (e.g., the performing device) to perform. For example, the displayed search result may include multiple graphical elements (e.g., GUI elements) that each indicate a different one of the multiple functions. In these examples, to detect the user selection of the displayed search result, the smart watch device may detect a user selection of one of the multiple graphical elements. As such, in these examples, the indication of the user selection of the displayed search result may be an indication of the user selection of the one of the multiple graphical elements. The performing device may perform the one of the multiple functions indicated by the one of the multiple graphical elements selected by the user in response to receiving the indication. In other examples, one or more of the multiple graphical elements included in the displayed search result may also indicate at least one of the following: (1) a performing device that is configured to perform the one of the multiple functions associated with the graphical element; (2) whether the performing device is communicatively coupled to the smart watch device; (3) whether the performing device has been previously communicatively coupled to the smart watch device; (4) a communication interface by which the performing device is communicatively coupled to the smart watch device; (5) a location of the performing device; and (6) availability of the performing device to perform the one of the multiple functions.

In some examples, the smart watch device may detect a user input configured to cause the performing device to display an expanded version of the selected search result. In these examples, the smart watch device may transmit an indication of the user input to the performing device. To perform the function indicated by the selected search result, the performing device may first display the expanded version of the selected search result in response to receiving the user input, subsequently detect a user selection of the expanded version of the selected search result, and then perform the function indicated by the selected search result in response to detecting the user selection.

According to the techniques disclosed herein, a user enters a search query into a smart watch device. The smart watch device, which receives the search query, maybe be referred to as a "searching device" in some examples. The smart watch device transmits the search query to a search system. In one example, the smart watch device may transmit the search query to the search system via another computing device (e.g., a "performing device," or another intermediate computing device, which are described below) to which the smart watch device is tethered. The smart watch device being tethered to another computing device, as described herein, may refer to the smart watch device being communicatively coupled to the other computing device using a short-range wired and/or wireless communication interface or connection, such as, e.g., USB, Bluetooth®, Ethernet (e.g., LAN), and/or Wi-Fi® (e.g., wireless LAN (WLAN)). In this example, the other computing device may then transmit the search query received from the smart watch device to the search system via the Internet. In another example, the smart watch device may not be tethered to another computing device, but instead may be configured to connect to the search system directly via the Internet (e.g., via a cellular network, Wi-Fi®, and/or another wireless technology) and transmit the search query to the search system. In any case, the search system generates search results in response to receiving the search query and transmits the generated search results to the smart watch device. The smart watch device can then display the search results to the user. Specifically, as described herein, the smart watch device may display a single one of the search results at any given time. A search result that is displayed to the user may be referred to herein as a "displayed search result," or a "displayed result."

The user can select the displayed result on the smart watch device. In response to the user selecting the displayed result, the smart watch device indicates to a second computing device that the displayed result has been selected. The displayed result that is selected by the user on the smart watch device may be referred to herein as a "selected search result," or a "selected result." The second computing device, which receives the indication from the smart watch device that the user has selected the displayed result, may be referred to herein as a "performing device." The performing device performs one or more operations, or functions, according to the selected result in response to receiving the indication from the smart watch device. For example, the performing device can launch a native application included on the performing device and set the native application into a state indicated by the selected result. The user that entered the search query into the smart watch device can then view and interact with the launched native application on the performing device. In another example, instead of launching a native application, the performing device can show an expanded view of the selected result (e.g., a view that includes more image/text content, detail, and/or graphical user interface (GUI) input/output options compared to the selected result). Displaying the expanded view of the selected result may be beneficial in scenarios where the user would like to view the selected result on a larger screen, assuming that the smart watch device has a relatively smaller display screen size, and that the performing device (e.g., a smart phone, or a tablet) has a relatively larger display screen size.

The techniques of the present disclosure may be implemented for various different network topology arrangements of the smart watch device, performing device, and search system. In some examples (e.g., FIG. 9A), the smart watch device may be tethered to the performing device such that the smart watch device communicates with the search system via the performing device. For example, the smart watch device may communicate with the performing device via a short-range wired connection (e.g., USB) or a short-range wireless connection (e.g., Bluetooth®), and the performing device may communicate with the search system via the Internet (e.g., via a cellular network, or a home router). In other examples (e.g., FIG. 8A), the smart watch device and the performing device may independently communicate with the search system. For example, the smart watch device and the performing device may have their own separate wireless internet connections that each enable communication with the search system via the Internet. The separate wireless connections may be wireless connections to the same wireless router at home, for example. The separate wireless connections may also be different types of wireless connections, depending on the connectivity options available on the smart watch device and the performing device. For example, the smart watch device may be configured to communicate with the Internet via a cellular radio, or network, connection and the performing device may be configured to communicate with the Internet via a Wi-Fi® connection.

While in some examples, the smart watch device of the present disclosure can indicate a selected result to one performing device, in other examples, the smart watch device may indicate a selected result to multiple different performing devices. In these examples, the multiple performing devices can perform functions indicated by the smart watch device (i.e., by the selected result), such as opening, or launching, native applications and/or a web browser to a state indicated by the smart watch device (i.e., by the selected result). Examples in which a single smart watch device indicates a selected result to multiple different performing devices are illustrated and described with respect to FIGS. 11-12.

The search results generated by the search system include one or more result objects. A single result object may refer to data associated with a single search result (e.g., a single displayed result, or a single selected result). The search system transmits the result objects to the smart watch device. The smart watch device generates one or more displayed results using the result objects. For example, the smart watch device may generate one displayed result for each result object received from the search system. Specifically, the smart watch device displays only one (i.e., a single) displayed result at any given a time. As described herein, in examples where the display of the smart watch device has a relatively small screen size, it may be beneficial to fill the entire display of the smart watch device with a single displayed result. As a result, the user may view the displayed result in sufficient detail and/or resolution, which may help the user to correctly interpret and/or interact with the displayed result. In this example, the user may use a gesture (e.g., a swipe) on a touchscreen of the smart watch device (e.g., on a touch-sensitive, or a presence-sensitive display of the smart watch device), or interact with a physical button of the smart watch device, to cause the smart watch device to display another one of the displayed results. For example, the other single displayed result may be a next displayed result in an order of the displayed results, which may be defined by one or more result scores associated with the received search results, as described herein.

A result object may include a variety of different data described herein. A result object may include one or more access mechanisms for accessing functionality of an application. For example, a result object may include on or more application access mechanisms (AAMs). Additionally, or alternatively, a result object may include a web access mechanism (WAM). In some examples, a result object may include an application download address. AAMs, WAMs, and application download addresses are described in greater detail below. A result object may also include additional data used by the smart watch device to generate a displayed result. For example, a result object can include text and/or images that may be displayed in the displayed result. The text and/or images displayed to a user may indicate the operations, or function, that will be performed in response to the user selecting the displayed result on the smart watch device. For example, if the displayed result is for a song in a music playing application, the text and/or images may identify the music playing application that will be launched by the performing device and the song that will be played by the music playing application when the user selects the displayed result on the smart watch device. Example displayed results are illustrated in FIGS. 5B-5D, 6B-6C, and 7B.

A result object may also include data (e.g., instructions) that defines how to render a displayed result. The smart watch device can render a displayed result based on such data included in a result object corresponding to the displayed result. The result object can include data that defines the graphical aspects (e.g., formatting and arrangement) of the displayed result, such as the layout of text, images, and animations in the displayed result. In some examples, the data that defines how to render the displayed result may be device-specific data that indicates different formatting and arrangement depending on the display capabilities of the smart watch device. For example, if the smart watch device has a relatively smaller display, the formatting and arrangement data may indicate how to render the displayed result on the smaller display (e.g., as a single displayed result that takes up the entirety of the smaller display). If the smart watch device has a relatively larger display, the formatting and arrangement data may indicate how to render the displayed result on the larger display (e.g., as a single displayed result that takes up some or all of the larger display). In other examples, the smart watch device may receive a result object that does not include formatting and arrangement data. In these examples, the smart watch device (e.g., a native application, a web browser, and/or an operating system (OS) of the smart watch device) may determine how to format a displayed result corresponding to the received result object.

A result object can include data that defines additional user interface elements, such as user inputs and outputs. Example user inputs may include, but are not limited to, graphical buttons, text boxes, and menus (e.g., drop down menus). Example user outputs may include GUI elements configured to display text and/or graphics to the user. A result object can also include data that defines how to retrieve information from the Internet (e.g., an application server, a web server, and/or the search system). For example, portions of a displayed result generated for a result object received in response to a search query may be populated in real-time after the search query is transmitted (i.e., after the result object is received and the displayed result is generated). In this example, the result object may include data that instructs the smart watch device where to obtain the real-time data (e.g., via a web address). The real-time data may include a variety of different types of data, including, but not limited to, weather data, ticket availability, stock market data, restaurant table availability, and current taxi locations. A result object can also include instructions for performing calculations, such as calculations based on a user input. For example, a result object may include data used to render a calculator (e.g., scientific and/or graphing), or a similar mathematical interface, within a corresponding displayed result. Example data included in a result object may be generated by the search system according to a function record described with respect to FIG. 4.

Figure 9A:
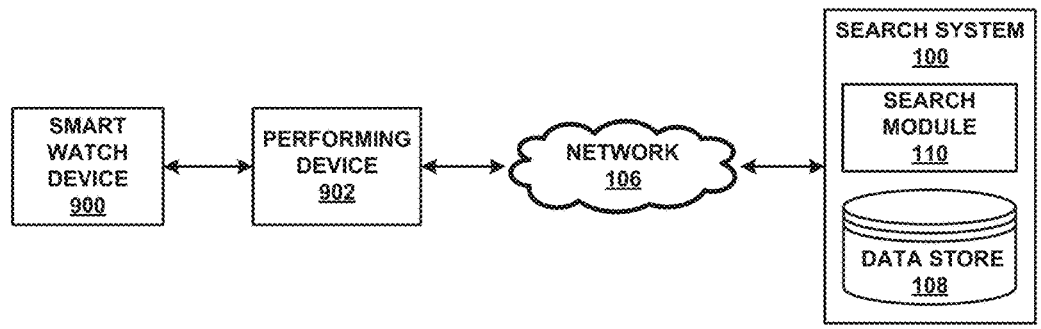

A result object can further include data (e.g., instructions) that defines how the smart watch device indicates selection of the displayed result to the performing device. In examples where the smart watch device is directly connected (e.g., wirelessly via Bluetooth®) to the performing device, the smart watch device can indicate a selection of a displayed result to the performing device via the direct connection, as illustrated in FIG. 9A. In examples where the smart watch device is not directly connected (e.g., via a wireless connection, or a wired connection) to the performing device, the smart watch device can indicate a selection of a displayed result to the performing device by transmitting an indication of the selection to the performing device via the Internet, or a more local network, such as a home or business network (e.g., LAN or WLAN).

The indication of the selected result sent from the smart watch device to the performing device can include a variety of different types of data. In some examples, the indication may include one or more access mechanisms (e.g., one or more AAMs, WAMs, and one application download addresses). For example, the smart watch device may transmit one or more AAMs of the selected result to the performing device so that the performing device can access a state of a native application installed on the performing device. In this example, the smart watch device may transmit an application download address also included in the selected result to the performing device so that the performing device can download and install the native application. In another example, the smart watch device may transmit a WAM of the selected result to the performing device so that the performing device can access a web address (e.g., a URL) using a web browser installed on the performing device. In examples where the smart watch device receives the search results via the performing device (e.g., via the tethered connection of FIG. 9A), the smart watch device may not need to transmit an access mechanism, but instead may indicate to the performing device which search result (e.g., via a rank number) has been selected by the user. In these examples, since the performing device relays the search results to the smart watch device, the performing device may already have one or more access mechanisms included in the search results stored in the performing device. This may allow the smart watch device to simply indicate which search result has been selected by the user without explicitly transmitting an access mechanism for the selected result. In still another example, the smart watch device may transmit a function identifier (ID) to the performing device. In this example, the performing device may use the function ID to access a function record used by the search system to generate the selected result. The performing device may then select one or more access mechanism associated with the search result from the identified function record.

The indication transmitted by the smart watch device to the performing device may indicate one or more operations for the performing device to perform. As described above, the indication may either include an access mechanism (e.g., an AAM, a WAM, and/or an application download address), or specify a location from which the access mechanism can be retrieved. For example, an AAM may be a string that includes a reference to a native application and indicates one or more operations for the performing device (e.g., the native application) to perform. A WAM may include a resource identifier (e.g., a URL) that directs a web browser of the performing device to a web resource. An application download address may include data used by the performing device to download a native application referenced in an AAM, e.g., from a digital distribution platform. AAMs, WAMs, and application download addresses are described in greater detail hereinafter.

Transmission of the indication of the selected result from the smart watch device to the performing device may involve a variety of different network paths. In examples where the smart watch device is directly connected to the performing device via a wired connection (e.g., USB) or a wireless connection (e.g., a short-range wireless connection, such as Bluetooth®), the smart watch device may transmit the indication to the performing device via the direct connection (e.g., via the wired connection, or short-range wireless connection). In examples where the smart watch device is not directly connected to the performing device, the smart watch device may transmit the indication to the performing device via a network. For example, the smart watch device may transmit the indication to the performing device via the Internet. As another example, the smart watch device may transmit the indication to the performing device through a more local network (e.g., a home network, such as a LAN or WLAN). In still other examples, the smart watch device may transmit the indication to the search system, and the search system may then transmit the indication to the performing device.

In examples where the smart watch device indicates a function ID to the performing device, the smart watch device may transmit the function ID directly to the performing device, which may then retrieve one or more access mechanisms included in the corresponding function record from the search system. In other examples, the smart watch device may transmit the function ID to the performing device via the Internet, or a more short-range network (e.g., a business or home network), and the performing device can send the function ID to the search system to retrieve the access mechanisms from the search system. In still other examples, the smart watch device may transmit the function ID to the search system, which may then transmit the access mechanisms to the performing device.

As described herein, the smart watch device generates displayed results based on data included in result objects received by the smart watch device. For example, with respect to FIGS. 5B-5D, the smart watch device may generate a single displayed result at a time based on data included in a single result object received by the smart watch device. For example, the single displayed result may occupy the entire viewable area of the display of the smart watch device. Put another way, in some examples, the smart watch device may be configured to display only one displayed result at a time. The smart watch device may be configured to display only a single displayed result in scenarios where the smart watch device has limited display area. For example, because the smart watch device is a wearable computing device (i.e., a wrist watch computing device), the display of the smart watch device may be limited in size (e.g., have a screen diagonal size of 2 inches or less in some cases). In these examples, generating a single displayed result may allow the user to fully view the displayed result and easily assess whether the displayed result is desirable for the user to select.

The way in which a user selects a displayed result may vary depending on the format of the displayed result. In some examples, a user may select a displayed result by touching (e.g., tapping) a portion of the displayed result. For example, the user may select the displayed result by touching the portion of the display of the smart watch device including the displayed result. In examples where the smart watch device displays only a single search result, the user may select the single displayed result by touching anywhere on the display. In still other examples, the displayed result may include regions that are indicated as places where the user may tap to select the displayed result. For example, the displayed result may include a button graphic (e.g., the button including the string "Navigate Car" of FIG. 5B) that indicates where the user can tap to select the displayed result. In some examples, the displayed result may include text and/or images that indicate the action that will be taken when the user interacts with the displayed result. For example, the displayed result may indicate a native application that will be launched on the performing device, a web location that will be accessed using a web browser of the performing device, or an expanded view that will be shown on the performing device.

As described above, the smart watch device may indicate the selected result to the performing device. In some examples, the smart watch device may automatically select the performing device. For example, if the smart watch device is tethered to the performing device, the smart watch device may automatically transmit the indication to the performing device in response to the user selection of the displayed result. In other examples, the smart watch device may prompt the user to select the performing device. For example, after the user selects a displayed result, the smart watch device may display indications of one or more different possible performing devices to the user. The user may then select from the one or more possible performing devices. In response to selection of a performing device, the smart watch device may transmit an indication of the selection to the selected performing device.

In some scenarios, there may be multiple possible performing devices that the user may wish to use. In some examples, the smart watch device may detect the multiple possible performing devices. For example, the smart watch device may detect a particular performing device based on wired connection (e.g., via USB), or a wireless connection (e.g., via Bluetooth®) with the performing device. In some examples, the smart watch device may maintain a list of possible performing devices that the user may select from and use. For example, the list may include a mobile device (e.g., a smart phone, or tablet), a laptop computing device, and/or a desktop computing device. The smart watch device may display one or more of the possible performing devices from the list. In some examples, the smart watch device may maintain a history of past performing devices to which the smart watch device has transmitted indications in the past.

In some examples, the performing device may be determined by the smart watch device and/or the search system based on a relative geo-location of the smart watch device and the performing device. For example, the smart watch device may determine which computing devices are near (e.g., in the same location, or within a short distance) the smart watch device (e.g., based on geo-location) and then transmit an indication of the selected result to the performing device(s) that are near the smart watch device. The search system may facilitate the geo-location determinations made by the smart watch device. For example, the search system may determine the geo-location of the smart watch device based on geo-location data included in the query wrapper. The search system may also maintain communication with other possible performing devices to determine the location of the other possible performing devices. For example, the possible performing devices may include software that communicates their positions to the search system.

FIG. 1 illustrates an example environment that includes a search system 100, user devices 102, one or more data sources 104, and a network 106. In the example environment of FIG. 1, the search system 100 includes a data store 108 and a search module 110. Also in this example, the user devices 102 include a smart watch device 112 and one or more performing devices 114. The data source(s) 104 are described in greater detail below with reference to FIG. 3. According to the techniques disclosed herein, a user device 102 (e.g., the smart watch device 112) receives a search query from a user of the user device 102 (e.g., via a user interface of the user device 102) and transmits the search query to the search system 100. In some implementations, the user device 102 includes the search query in a query wrapper. The search system 100 receives the search query from the user device 102 and generates one or more search results (e.g., one or more result objects) in response to receiving the search query. The search system 100 transmits the search results (e.g., the result objects) to the user device 102 that provided the search query. The data store 108 and the search module 110 included in the search system 100 are used to generate the result objects, as described herein. Operation of an example search system 100 including the data store 108 and the search module 110 is now described.

In some implementations, the smart watch device 112 may transmit additional data along with the search query. In these implementations, the smart watch device 112 may include the additional data and the search query in a query wrapper. The query wrapper may include the search query as well as data associated with the search query. Examples of the additional data can include, but are not limited to, geo-location data (e.g., data indicating a location of the smart watch device 112), platform data (e.g., a version of an OS of the smart watch device 112, a device type or description of the smart watch device 112, such as a display size, display technology, processing capabilities, graphics rendering capabilities, and/or a version of a web-browser of the smart watch device 112), an identity of a user of the smart watch device 112 (e.g., a username), partner specific data, and other data. The smart watch device 112 transmits the query wrapper to the search system 100. The search system 100 can use the search query and/or the additional data included in the query wrapper to generate the search results.

In some examples described herein, the smart watch device 112 can transmit the query wrapper to one of the performing device(s) 114. This may be the case if the smart watch device 112 connects to the Internet, thereby connecting to the search system 100, via the performing device 114. In examples where the performing device 114 receives the query wrapper from the smart watch device 112, the performing device 114 may modify the query wrapper generated by the smart watch device 112 and transmit the modified query wrapper to the search system 100. For example, the performing device 114 may add, remove, or otherwise modify data included in the query wrapper received from the smart watch device 112. In some examples, the performing device 114 may add data to the query wrapper indicating information related to the performing device 114. For example, the performing device 114 may add data to the query wrapper, such as geo-location data (e.g., indicating a location of the performing device 114), platform data (e.g., indicating a version of an OS of the performing device 114, a device type or description of the performing device 114, such as a smart phone, a tablet, a personal computer, or a television, and a version of a web browser of the performing device 114), and an identity of a user of the performing device 114 (e.g., a username). In these examples, the query wrapper received by the search system 100 from the performing device 114 may include data related to both the smart watch device 112 and the performing device 114. Accordingly, the search system 100 may determine specific information for each of the computing devices, such as an OS of each device, a geo-location of each device, and a device type or description of each device. For example, the search system 100 may determine whether the smart watch device 112 and the performing device 114 include a wearable computing device (e.g., a smart watch, a head-mounted display, such as smart glasses, or smart contact lenses), a smart phone, a tablet computing device, a laptop or desktop computing device, a television, or another computing device. As described herein, in some examples, the search system 100 may format the search results (e.g., the result objects) transmitted by the search system 100 to the smart watch device 112 based on the device type or description, or any other properties, of the smart watch device 112 and/or the performing device 114 indicated by the data included in the query wrapper. As one example, the search system 100 may use the device type or description of the smart watch device 112 indicated by the query wrapper to generate formatting data to be included in the search results. The formatting data may define how the search results will be displayed on the smart watch device 112, as described herein. As another example, the search system 100 may use the device type or description of the performing device 114 indicated by the query wrapper to include one or more access mechanisms (e.g., an AAM, a WAM, and/or an application download address) that are compatible with the performing device 114 in the search results, as also described herein.

The search system 100 includes the data store 108 that the search system 100 uses to generate the search results. The data store 108 includes one or more different function records (e.g., the function record 400 of FIG. 4). Each function record may include data related to a function of a native application and/or a state of the native application resulting from performance of the function. As described herein, a function record may include a function ID, application state information (ASI), one or more access mechanisms, and other result object data described above. The access mechanisms can include, but are not limited to, one or more AAMs, one or more WAMs, and/or one or more application download addresses. The function records described herein may include additional data in some examples. In other examples, the function records may include less data than that illustrated in FIG. 4. For example, a function record may include an AAM, but not include a WAM. In still other examples, a function record may include a WAM, but not include an AAM. In some examples, a function record may include multiple different AAMs.

An AAM may be a string that includes a reference to a native application and indicates one or more operations for a user device 102 (e.g., one of the performing device(s) 114) to perform. In response to selection of the AAM by a user on the smart watch device 112, the performing device 114 may launch the native application referenced in the AAM and perform the one or more operations indicated by the AAM. For example, the performing device 114 may perform the one or more operations to set the native application into a particular state.

Native applications can perform a variety of different functions for a user. For example, a restaurant reservation application can make reservations for restaurants. As another example, an internet media player application can stream media (e.g., a song, or a movie) from the Internet. In some examples, a single native application can perform more than one function. For example, a restaurant reservation application may allow a user to retrieve information about a restaurant, read user reviews for the restaurant, and view a menu of the restaurant. As another example, an internet media player application may allow a user to perform searches for digital media, purchase digital media, stream digital media, and generate digital media playlists.

An AAM includes data which a user device 102 (e.g., one of the performing device(s) 114) can use to access functionality provided by a native application. For example, an AAM can include data that causes a performing device 114 to launch a native application installed on the performing device 114 and perform a function associated with the native application. Performance of a function according to an AAM may set a native application into a specified state. Accordingly, the process of launching a native application and performing a function according to an AAM may be referred to herein as launching the native application and setting the native application into a state that is specified by the AAM. In one example, an AAM for a restaurant reservation application can include data that causes a performing device 114 to launch the restaurant reservation application and make a reservation at a restaurant or indicate available reservation times. In this example, the restaurant reservation application may be set in a state that displays reservation information to a user, such as a reservation time, a description of the restaurant, and user reviews. In another example, an AAM for an internet media player application can include data that causes a performing device 114 to launch the interment media player application and stream media from the Internet. In this example, the internet media player application may be set in a state that displays information regarding the media (e.g., music) being streamed, such as a song name, an artist name, or an album name.

AAMs may have various different formats and content. The format and content of an AAM may depend on the native application with which the AAM is associated and the operations that are to be performed by the native application in response to selection of the AAM. For example, an AAM for an internet music player application may differ from an AAM for a shopping application. The AAM for the internet music player application may include references to musical artists, songs, and albums, for example. The AAM for the internet music player application may also reference operations, such as randomizing a list of songs and playing a song or album. The AAM for the shopping application may include references to different products that are for sale. The AAM for the shopping application may also include references to one or more operations, such as adding products to a shopping cart and proceeding to a checkout.

A user may select a displayed result on the smart watch device 112 to cause one of the performing device(s) 114 to launch the native application identified in the displayed result and perform one or more operations according to the AAM associated with the displayed result. Put another way, when a user selects a displayed result on the smart watch device 112, the performing device 114 launches a native application installed on the performing device 114 and sets the native application into a state defined by the AAM associated with the displayed result. In general, a state of a native application may refer to one or more operations and/or the resulting outcome of the native application performing the operations in response to a user selection of a displayed result. A state of a native application may also be referred to herein as an "application state."

An application state of a native application specified by an AAM may depend on the functionality provided by the native application. For example, if a native application is configured to retrieve and display information from an external resource (e.g., a web server) via the Internet, the application can be set into a state in which the application retrieves information from the external resource via the Internet and displays the information to the user. In another example, if a native application is configured to play media from an external resource via the Internet (e.g., music and/or video), the application can be set into a state in which the application is playing a song or a movie from the external resource via the Internet. In another example, if a native application is configured to make restaurant reservations, the application can be set into a state in which the application displays available restaurant reservations to the user.

An AAM included in a function record includes data that causes a user device 102 (e.g., one of the performing device(s) 114) to launch a native application and perform a function associated with the native application. For example, an AAM included in a function record may be a string that includes a reference to a native application and indicates one or more operations for a performing device 114 (e.g., the native application) to perform. An AAM may include an application resource identifier (ARI) and/or one or more operations for a performing device 114 to perform. An ARI may be a string having an application specific scheme in some examples. The ARI may include a reference to a native application and indicate one or more operations for a performing device 114 (e.g., the native application installed on the performing device 114) to perform. For example, the ARI may include a reference to the native application, a domain name, and a path to be used by the application to retrieve and display information to the user. An example ARI is described with reference to the function record 400 of FIG. 4.

In some examples, an AAM may include operations for a performing device 114 to perform in addition to one or more operations indicated by an ARI of the AAM. For example, a native application installed on a performing device 114 and/or an OS of the performing device 114 may perform these additional operations included in the AAM. In some examples, the operations may be included in a script. Examples of the operations may include, but are not limited to, launching a native application, creating and sending a search request to an application server, setting a current geographic location in a native application, making a restaurant reservation, sending a text message, and adding an appointment to a calendar.

In some examples, an AAM may not include an ARI. Instead, the AAM can include one or more operations that reference a native application and indicate one or more operations for a performing device 114 to perform. The one or more operations may include instructions for the native application and/or an OS of the performing device 114. In response to selection of the AAM, the performing device 114 may perform the operations included in the AAM.

A function ID included in a function record may be a string that uniquely identifies the function record among other function records included in the data store 108. In some examples, the function ID may describe a function and/or an application state in human-readable form. For example, the function ID may be a human-readable string that describes a function performed according to an AAM and/or an application state resulting from performance of the function according to the AAM. In a more specific example, a function ID of a function record that describes a song within an internet music player application may include a name of the internet music player application along with a name of the song that will be played when the internet music player application is set into an application state defined by an AAM included in the function record. An example function ID is described with reference to the function record 400 of FIG. 4.

A function record includes ASI. The ASI includes data that describes an application state into which a native application is set according to an AAM included in the function record. In some examples, the ASI may include data that describes a function performed according to the AAM included in the function record. The ASI can include text, numbers, and symbols that describe the application state or function. The types of data included in the ASI may depend on the type of information associated with the application state and the functionality specified by the AAM.

In some examples, the ASI includes data that is presented to the user when the native application is in the application state defined by the AAM. For example, a function record associated with a shopping application can include ASI that describes products (e.g., names and prices) that are shown when the shopping application is set into an application state defined by an AAM of the function record. As another example, a function record associated with a music player application can include ASI that describes a song (e.g., name and artist) that is played when the music player application is set into an application state defined by an AAM of the function record.

The ASI included in a function record may be generated in a variety of different ways. In one example, data to be included in the ASI may be retrieved via partnerships with database owners and developers of native applications. For example, the data may be automatically retrieved from online databases that include, but are not limited to, data related to movies, television programs, music, and restaurants. In some examples, some data included in the ASI may be manually generated by a human operator. The data included in the ASI may be updated over time so that the search system 100 provides up-to-date search results.

The search system 100 generates one or more search results including one or more result objects using the function records included in the data store 108. Initially, the search system 100 analyzes a search query received from the smart watch device 112. The search system 100 then identifies a set of function records included in the data store 108 based on the received search query. In a specific example, the search system 100 may determine how well terms of the search query match terms of ASI of the identified function records of the consideration set using Lucene® information retrieval software developed by the Apache Software Foundation. The identified set of function records may be referred to herein as a "consideration set." For example, the search system 100 may identify the consideration set based on one or more matches (e.g., text matches) between one or more terms of the search query and one or more terms of the ASI included in the function records of the consideration set.

The search system 100 processes (e.g., scores) the consideration set. For example, the search system 100 may determine how well the function records of the consideration set match the received search query. The search system 100 may then select one or more function records that best match the received search query (e.g., the highest-scoring function records) from the consideration set to use in generating the result objects. The search system 100 then generates the result objects based on the selected function records. For example, the search system 100 may select access mechanisms (e.g., AAMs, WAMs, and application download addresses) from the selected function records to include in the result objects. The search system 100 then transmits the result objects to the smart watch device 112 that generated the search query. The smart watch device 112 receives the search results including the result objects, displays the search results to a user as a single displayed result at a time, detects a user selection of a particular displayed result, and transmits an indication of the user selection to one of the performing device(s) 114. The performing device 114 performs a function associated with the selected result in response to receiving the indication.

Figure 4:
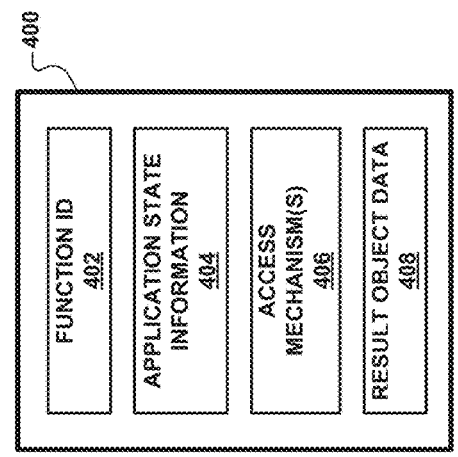
FIG. 4 illustrates an example function record of a search system.

As described above, the function records of the present disclosure are not required to have the format shown in FIG. 4. For example, the function records may include additional information in addition to that included in the function record of FIG. 4. In some examples, the function records may include less data than that indicated by the function record of FIG. 4. For example, a function record may include a single AAM and no WAM. In other examples, a function record may include multiple AAMs and no WAM. In still other examples, a function record may include a WAM but not an AAM.

Figure 2:
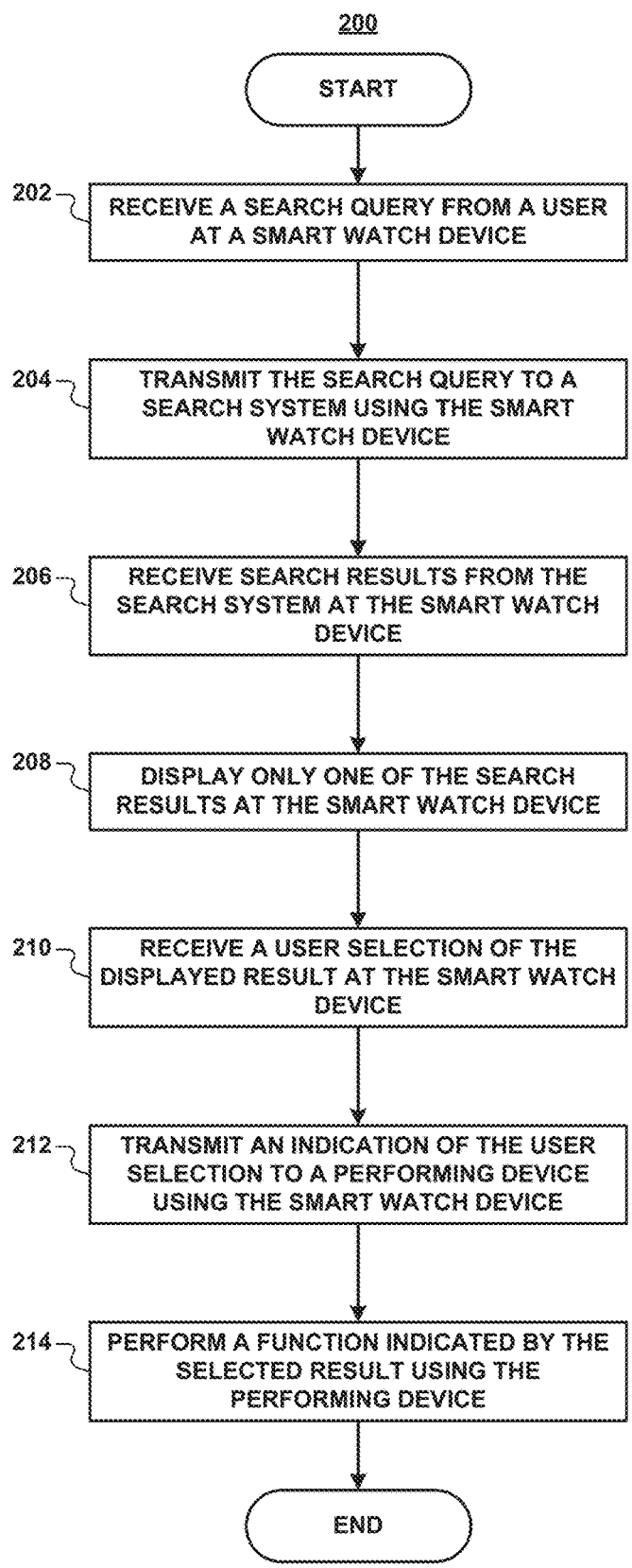
FIG. 2 is a flow diagram that illustrates an example method for performing a search using a smart watch device and accessing results of the search using a performing device.

FIG. 2 is a flow diagram that illustrates an example method 200 for using a smart watch device 112 to perform a search, and a separate performing device 114 to access the functionality of a selected result. In block 202, the smart watch device 112 receives a search query from a user of the smart watch device 112. The search query may include text, numbers, and/or symbols (e.g., punctuation) entered into the smart watch device 112 by the user. For example, the user may have entered the search query into a search field (e.g., a search box) of a search application running on the smart watch device 112. The user may have entered the search query using a touchscreen keypad, a mechanical keypad, and/or via speech recognition. As described herein, in some examples, the search application may be a native application dedicated to search, or a more general application, such as a web browser application.

The smart watch device 112 can be any computing device that has a wrist watch form factor and is capable of providing search queries to the search system 100. For example, the smart watch device 112 can be a wearable computing device that includes a relatively small display screen size, as described herein. Additionally, as also described herein, the computing device receiving the search query from the user may be another wearable computing device, other than the smart watch device 112, having another form factor, such as e.g., smart glasses, or smart contact lenses.

The smart watch device 112 may use a variety of different operating systems. In some examples, the smart watch device 112 may run an OS including, but not limited to, ANDROID® developed by Google Inc., IOS® developed by Apple Inc., WINDOWS PHONE® developed by Microsoft Corporation, or TIZEN® developed by the Linux Foundation. In other examples, the smart watch device 112 may run an OS including, but not limited to, MICROSOFT WINDOWS® developed by Microsoft Corporation, MAC OS® developed by Apple Inc., or LINUX® (LINUX® is the registered trademark of Linus Torvalds in the U.S. and other countries). The smart watch device 112 may also access the search system 100 while running operating systems other than those operating systems described above, whether presently available or developed in the future.

The smart watch device 112 can communicate with the search system 100 via a computer network (e.g., the network 106), such as the Internet. In some examples, the smart watch device 112 may communicate with the search system 100 using a native application installed on the smart watch device 112 (e.g., a search application). In general, the smart watch device 112 may communicate with the search system 100 using any application that can transmit search queries to the search system 100. In some examples, the smart watch device 112 may run an application that is dedicated to interfacing with the search system 100, such as an application dedicated to searches (e.g., a search application). In other examples, the smart watch device 112 may communicate with the search system 100 using a more general application, such as a web browser application. The application run by the smart watch device 112 to communicate with the search system 100 may display a search field (e.g., the search field 506 of FIG. 5A) within a GUI into which the user may enter search queries. The user may enter a search query using a touchscreen, or physical keyboard, a speech-to-text program, or another form of user input.

In general, a search query may be a request for information retrieval (e.g., search results) from the search system 100. For example, a search query may be directed to retrieving one or more search results that indicate native application functionality, or application states, in examples where the search system 100 is configured to generate one or more AAMs as the search results. A search query directed to retrieving one or more search results related to native applications may indicate a user's desire to access functionality of one or more native applications described by the search query.

In block 204, the smart watch device 112 transmits the search query to the search system 100. The search system 100 generates search results that are responsive to (i.e., based on) the search query and transmits the search results to the smart watch device 112. In block 206, the smart watch device 112 receives the search results (e.g., result objects) from the search system 100. In block 208, the smart watch device 112 generates a single displayed result at a time based on one of the received search results (i.e., one of the result objects). In other words, the smart watch device 112 renders the result objects of the search results into displayed results. The smart watch device 112 outputs the displayed results to the user via the search application running on the smart watch device 112 (e.g., as a search engine results page, or "SERP," within a GUI of the search application). Specifically, the smart watch device 112 displays only one of the received search results on the smart watch device 112 as a displayed result at any given time. The user may interact with the smart watch device 112 (e.g., swipe a touchscreen, or use a physical button of the smart watch device 112) to browse through the received search results, which the smart watch device 112 displays to the user as displayed results one displayed result at a time.

In block 210, the smart watch device 112 detects, or receives, the user's selection of the displayed result. The user may select the displayed result by interacting in some way with the displayed result. The smart watch device 112 may detect the user's selection by detecting the user interaction. In some examples, the user may tap the displayed result to select the displayed result. In this example, the smart watch device 112 may detect the tapping of the displayed result. In some examples, the entire displayed result may be tapped by the user to select the displayed result. In other examples, a displayed result may include a region (e.g., a graphical button) within which the user may tap to select the displayed result. The user may select a displayed result in any suitable manner. For instance, the user may use voice controls to select a displayed result.

In block 212, the smart watch device 112 transmits an indication of the user selection to the performing device 114, as described above. In some examples, the indication may include one or more instructions or commands for the performing device 114. In these examples, the performing device 114 may perform a function specified by the selected result in response to receiving the indication, as described below. For example, the performing device 114 may perform the function using the one or more instructions or commands included in the indication. In one specific example, to transmit the indication to the performing device 114, the smart watch device 112 may broadcast an "intent" (e.g., in the case of the ANDROID® OS) to the performing device 114 that causes the performing device 114 to perform the function. In another specific example, the smart watch device 112 may transmit data to the performing device 114 that causes the performing device 114 to broadcast the intent, thereby causing the performing device 114 to perform the function. Accordingly, as described herein, the smart watch device 112 may include at least one of an OS, one or more native applications, and a web browser application that are configured to communicate with the search system 100, receive a search query from a user, provide a query wrapper including the search query to the search system 100, receive search results from the search system 100, generate a single displayed result based on the search results, receive a user input indicating a selection of the displayed result, and transmit an indication of the user's selection to the performing device 114.

In block 214, the performing device 114 performs a function indicated by the selected result. For example, the performing device 114 may perform a function according to an AAM or a WAM associated with the selected result. As described above, in some examples, the performing device 114 may perform the function using one or more instructions or commands included in the indication of the user selection received by the performing device 114 from the smart watch device 112. The performing device 114 can be any computing device that is capable of receiving an indication of a user selection of a search result from the smart watch device 112, and performing a function according to the selected result. The performing device 114 can be, but is not limited to, a wearable computing device, a smart phone, a tablet computer, a laptop computer, or a desktop computer. The performing device 114 can also be another computing device having another form factor, such as computing device included in a vehicle, a gaming device, a television, or other appliance (e.g., a networked home automation device, or a home appliance). The performing device 114 may use a variety of different operating systems, as described herein with respect to the smart watch device 112.

The performing device 114 can communicate with the search system 100 via a computer network, such as the Internet. For instance, the performing device 114 may communicate with the search system 100 in examples where the smart watch device 112 communicates with the search system 100 via the performing device 114 (e.g., by being tethered to the performing device 114). In some examples, the performing device 114 may communicate with the search system 100 using a native application installed on the performing device 114. In other examples, the performing device 114 may communicate with the search system 100 using a more general application, such as a web browser application. Accordingly, as described herein, the performing device 114 may include at least one of an OS, one or more native applications, and a web browser application that are configured to communicate with the smart watch device 112 and the search system 100 and perform the function indicated by the selected result.

Figure 3:
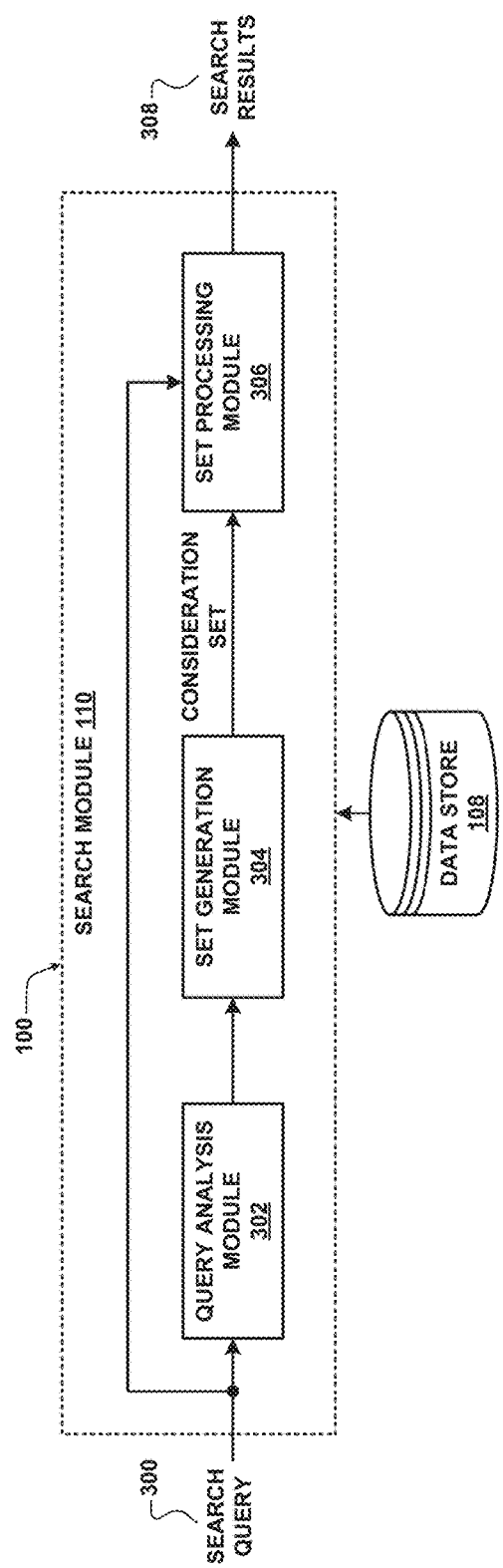
FIG. 3 is a functional block diagram of an example search module of a search system.

FIGS. 3-4 show examples of the search module 110 and the data store 108 of FIG. 1, and an example function record 400 that may be included in the search system 100 of the present disclosure. The search system 100 (e.g., the search module 110) of FIG. 3 may be configured to communicate with the smart watch device 112 and the performing device(s) 114 via a network (e.g., the network 106). In some examples, the smart watch device 112 and the performing device(s) 114 may communicate with the search system 100 via a partner computing system (an intermediate computing device; not illustrated). The partner computing system may be a computing system of a third party that may leverage the search functionality of the search system 100. The partner computing system may belong to a company or organization other than that which operates the search system 100. Example third parties which may leverage the functionality of the search system 100 may include, but are not limited to, internet search providers and wireless communications service providers. The smart watch device 112 and the performing device(s) 114 may send search queries to the search system 100 and receive search results via the partner computing system. The partner computing system may provide a user interface to the smart watch device 112 and the performing device(s) 114 in some examples, and/or modify the search experience provided on the smart watch device 112 and the performing device(s) 114.

As shown in FIG. 3, the search system 100 is configured to receive a search query 300 from the smart watch device 112 and perform a search for function records included in the data store 108 based on the received search query 300. As described herein, the search system 100 may receive the search query 300 generated by the smart watch device 112 via one of the performing device(s) 114 in some examples (e.g., as described with reference to FIG. 9A).

As also shown in FIG. 3, the search system 100 generates search results 308 including one or more result objects based on the received search query 300. For example, the search system 100 may generate the result objects based on data included in function records identified during the search. For instance, the search system 100 may generate a single result object based on data included in a single identified function record. The data store 108 may include one or more function records some or all of which may be identified during the search of the data store 108. Information that may be included in a function record is described with respect to FIG. 4. The data store 108 may include one or more databases, indices (e.g., inverted indices), tables, files, or other data structures which may be used to implement the techniques of the present disclosure. For example, the data included in the function records may be included in one or more databases, indices (e.g., inverted indices), tables, files, or other data structures. The search module 110 receives the search query 300 and generates the search results 308 (e.g., the result objects) based on data included in the data store 108 and the received search query 300.

The search system 100 performs a search for function records included in the data store 108 in response to the received search query 300 and/or additional data included in a query wrapper that includes the search query 300. The search system 100 generates the search results 308 (e.g., the result objects) based on the function records identified during the search. In some examples, the search system 100 generates result scores for the result objects, which may be used to rank the result objects and the search results 308 (e.g., the displayed results). The search system 100 may transmit the result scores to the smart watch device 112 along with the result objects so that the smart watch device 112 may rank the displayed results based on the result scores. For instance, the smart watch device 112 may determine an order in which the displayed results may be displayed, one at a time, on the smart watch device 112 (e.g., in response to user inputs) using the result scores associated with the corresponding result objects.

The search system 100 transmits the result objects to the smart watch device 112. The smart watch device 112 generates a single displayed result based on data included in a single one of the received result objects. In other words, the smart watch device 112 generates a single displayed result at one time, in each case using one of the received result objects. For example, as described herein, because the smart watch device 112 may have a limited amount of display screen space, the smart watch device 112 may generate the single displayed result such that it fills an entire display of the smart watch device 112 (e.g., rather than generating multiple displayed results at one time). In this manner, the single displayed result may be presented to the user on the smart watch device 112 in a sufficiently large size, with sufficiently great resolution, and/or with a sufficient amount of detail to be viewed and correctly interpreted by the user.

The smart watch device 112 may receive the search results 308 from the search system 100. As described herein, the search results 308 are responsive to the search query 300 transmitted by the smart watch device 112 to the search system 100. The smart watch device 112 may be running a search application including a GUI that displays the search results 308 as one displayed result at any given time. For example, the search application used to transmit the search query 300 to the search system 100 may also display the received search results 308 to the user as one displayed result at a time.

The GUI of the search application running on the smart watch device 112 may display the search results 308 to the user in a variety of different ways, depending on what information is transmitted to the smart watch device 112. As explained herein, the GUI may display the search results 308 to the user as one displayed result at a time. In some examples, the GUI may display a particular one of the search results 308 as a single displayed result, and subsequently (e.g., in response to a user input), display another one of the search results 308 as another single displayed result. The order in which the smart watch device 112 displays these displayed results (e.g., in response to the user input) may depend on how the corresponding search results 308 are ranked based on the associated result scores. For example, the smart watch device 112 may display the displayed results described above, one at a time, in an order defined by the result scores associated with the displayed results (e.g., associated with the corresponding result objects). In other examples, the smart watch device 112 may group displayed results together (e.g., to be consecutive) within an order if the displayed results are related to the same native application. Furthermore, in some examples, each displayed result may be positioned under the search field into which the user entered the search query 300.

The search system 100 may communicate with one or more different data sources (not illustrated), such as the data source(s) 104 of FIG. 1. With reference to the environment of FIG. 1, the data source(s) 104 may be sources of data which the search system 100 may use to generate and update the data store 108. For example, the search system 100 may use the data to update one or more databases, indices, tables, files, or other data structures included in the data store 108. The search system 100 may generate new function records and update existing function records based on data retrieved from the data source(s) 104. Although not illustrated, the search system 100 may include modules that generate new function records and update existing function records based on the data retrieved from the data source(s) 104. In some examples, data included in the data store 108 may be manually generated by a human operator.

The data source(s) 104 may include a variety of different data providers. The data source(s) 104 may include data from application developers, such as application developers' websites and data feeds provided by developers. The data source(s) 104 may include operators of digital distribution platforms configured to distribute applications to user devices 102 (e.g., the smart watch device 112 and the performing device(s) 114). The data source(s) 104 may also include other websites, such as websites that include web logs (i.e., blogs), application review websites, or other websites including data related to applications. Additionally, the data source(s) 104 may include social networking sites, such as FACEBOOK® by Facebook Inc. (e.g., Facebook posts) and TWITTER® by Twitter Inc. (e.g., text from tweets). The data source(s) 104 may also include online databases that include data related to movies, television programs, music, and restaurants. The data source(s) 104 may further include additional types of data sources in addition to the data sources described above. Different data sources may have their own content and update rates.

The search system 100 retrieves data from one or more of the data source(s) 104. The data retrieved from the data source(s) 104 can include any type of data related to application functionality and/or application states. The search system 100 generates function records based on the data retrieved from the data source(s) 104. In some examples, some data included in the function records (e.g., ASI) may be manually generated by a human operator. The data included in the function records may be updated over time so that the search system 100 provides up-to-date search results 308.

As described above, the smart watch device 112, the performing device(s) 114, the intermediate computing devices (e.g., "intermediate devices"), the search system 100, and the data source(s) 104 may be in communication with one another via a network (e.g., the network 106). The network may include various types of networks, such as a wide area network (WAN) and/or the Internet. Although the network may include a long range network (e.g., the Internet or WAN), in some implementations, the network may include a shorter range network, such as a local area network (a LAN, or a WLAN). In one embodiment, the network uses standard communications technologies and/or protocols. Thus, the network can include links using technologies such as Ethernet, Wireless Fidelity (Wi-Fi®) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other examples, the network can use custom and/or dedicated data communications technologies instead of, or in addition to, the ones described above.

The search module 110 includes a query analysis module 302, a consideration set generation module 304 (hereinafter, "set generation module 304"), and a consideration set processing module 306 (hereinafter, "set processing module 306"). The query analysis module 302, set generation module 304, and set processing module 306 may be embodied in computer-executable instructions stored in one or more memory components of the search system 100 and executed by one or more processing units of the search system 100. The query analysis module 302 receives a query wrapper including the search query 300. The query analysis module 302 analyzes the search query 300. The set generation module 304 identifies a set of function records included in the data store 108 based on the search query 300. The identified set of function records may be referred to herein as a "consideration set." The set processing module 306 processes (e.g., scores) the consideration set to generate the search results 308 that include result objects generated based on selected function records of the consideration set.

Referring now to FIG. 4, the example function record 400 includes a function ID 402, ASI 404, one or more access mechanisms 406, and result object data 408. The access mechanism(s) 406 may include one or more native AAMs (hereinafter, "AAMs"), one or more WAMs, and/or one or more application download addresses. The set processing module 306 may generate a result object based on the result object data 408, the access mechanism(s) 406, and, in some examples, the function ID 402. The function record 400 may include data related to a function of a native application and/or a state of the native application resulting from performance of the function. The data store 108 may include one or more function records each having a structure that is similar to that of the function record 400.

In some implementations, a function record may include multiple different AAMs. For example, the different AAMs may be associated with different editions of a native application. A native application edition (hereinafter, "application edition") refers to a particular implementation or variation of a native application. For example, an application edition may refer to a version of a native application, such as a version 1.0 or 2.0 of the application. In another example, an application edition may refer to an implementation of a native application for a specific platform, such as a specific OS.

The different AAMs included in the function record may cause the corresponding application editions to launch and perform similar functions. Accordingly, the different AAMs included in the function record may cause the corresponding application editions to be set into similar application states. In one example, if the different AAMs reference different editions of an information retrieval application, the different AAMs may cause the corresponding application editions to retrieve similar information. In another example, if the different AAMs reference different editions of an internet music player application, the different AAMs may cause the corresponding application editions to play the same song.

In a specific example, a function record for a native application that retrieves restaurant information may include multiple different AAMs for multiple different application editions. Assuming that the function record is associated with a specific Mexican restaurant, the AAMs for the different application editions may cause each application edition to retrieve information for the same specific Mexican restaurant. For example, a first AAM may cause a first application edition (e.g., for a first OS) to retrieve information for the specific Mexican restaurant. A second AAM may cause a second application edition (e.g., for a second OS) to retrieve information for the same specific Mexican restaurant. During some searches, the search system 100 may identify one or more function records that each include multiple AAMs.

In some implementations, a function record may include a WAM. The WAM may be a resource identifier that can be processed by a wide variety of performing devices 114 running different operating systems. In some examples, the WAM may include a uniform resource locator (URL) (i.e., a web address) used with HTTP.

A WAM (e.g., a URL) included in a function record may be used by a web browser to access a web resource that includes similar information and/or performs similar functions as would be performed by a native application that receives an AAM of the function record. In one specific example, a WAM of a function record may direct a web browser of a performing device 114 to a web version of a native application referenced in one or more AAMs of the function record. For example, if one or more AAMs included in a function record for a specific Mexican restaurant cause each corresponding native application edition to retrieve information for the specific Mexican restaurant, a WAM included in the function record may direct a web browser of the performing device 114 to a web page entry for the specific Mexican restaurant. During some searches, the search system 100 may identify one or more function records that each include one or more AAMs and a WAM.

In some examples, a function record may include one or more application download addresses. An application download address of a function record can be used by a user device 102 (e.g., the smart watch device 112 and/or one of the performing device(s) 114) to download a native application referenced in one or more AAMs of the function record in the event that the application is not installed on the user device 102. In some examples, the application download address may include a web address (e.g., a URL) at which the native application can be previewed and downloaded. For example, the application download address may direct a web browser of the user device 102 to a digital distribution platform that is configured to distribute native applications. Example digital distribution platforms include, but are not limited to, GOOGLE PLAY® developed by Google Inc., the APP STORE® developed by Apple Inc., and the WINDOWS PHONE STORE® developed by Microsoft Corporation. If the user device 102 includes a native download application for accessing a digital distribution platform, the application download address may direct the installed native download application to a site where the native application referenced in the AAM(s) of the function record can be downloaded.

The function ID 402 may be used to identify the function record 400 among the other function records included in the data store 108. The function ID 402 may be a string of alphabetic, numeric, and/or symbolic characters (e.g., punctuation marks) that uniquely identify the function record 400. In some examples, the function ID 402 may describe a function and/or an application state in human-readable form. For example, the function ID 402 may include a name of a native application referenced in an AAM included in the access mechanism(s) 406. Additionally, or alternatively, the function ID 402 may be a human-readable string that describes a function performed according to the access mechanism(s) 406 and/or an application state resulting from performance of the function according to the access mechanism(s) 406. In some examples, the function ID 402 may include a string in the format of a URL of a WAM for the function record 400, which may uniquely identify the function record 400.

In a more specific example, if the function record 400 describes a function of a native application YELP® by Yelp Inc. (hereinafter, "Yelp"), the function ID 402 may include the name "Yelp" along with a description of an application state corresponding to the function, e.g., as described in the ASI 404. In an example where the function record 400 describes an entry within Yelp for the restaurant THE FRENCH LAUNDRY®, the function ID 402 may be "Yelp—The French Laundry." In an example where the function ID 402 includes a string in the format of a URL, the function ID 402 may include the string "www.yelp.com/biz/the-french-laundry-yountville-2?ob=1" to uniquely identify the function record 400.

The ASI 404 may include data that describes an application state into which a native application is set according to an AAM included in the function record 400 (e.g., in the access mechanism(s) 406). Additionally, or alternatively, the ASI 404 may include data that describes a function performed according to the access mechanism(s) 406. The ASI 404 may include a variety of different types of data. For example, the ASI 404 may include structured, semi-structured, and/or unstructured data. The ASI 404 may be extracted or inferred from documents retrieved from the data source(s) 104 described above. In some examples, the ASI 404 may include data that is manually generated. The ASI 404 may also be updated so that up-to-date search results 308 can be provided in response to a user's search query 300.

In some examples, the ASI 404 includes data that is presented to a user when a native application referenced by an AAM included in the function record 400 (e.g., included in the access mechanism(s) 406) is in an application state defined by the AAM. For example, the ASI 404 may include data that describes the application state of the native application after a performing device 114 has performed one or more operations indicated by the AAM to set the application into the application state. In one example, if the function record 400 is associated with a shopping application, the ASI 404 may include data that describes products (e.g., names and prices) that are shown when the application is set into an application state defined by the access mechanism(s) 406 of the function record 400. In another example, if the function record 400 is associated with a music player application, the ASI 404 may include data that describes a song (e.g., a song name and an artist name) that is played when the application is set into an application state defined by the access mechanism(s) 406 of the function record 400.

The types of data included in the ASI 404 may depend on the type of information associated with the application state and the functionality defined by the access mechanism(s) 406. In one example, if the function record 400 is for a native application that provides reviews of restaurants, the ASI 404 may include information (e.g., text and numbers) related to a restaurant, such as a category of the restaurant, reviews of the restaurant, and a menu for the restaurant. In this example, the access mechanism(s) 406 may cause the native application to launch and retrieve information for the restaurant. As another example, if the function record 400 is for a native application that plays music, the ASI 404 may include information related to a song, such as a name of the song, an artist name, lyrics, and listener reviews for the song. In this example, the access mechanism(s) 406 may cause the native application to launch and play the song described in the ASI 404.

An AAM (e.g., included in the access mechanism(s) 406) may include an ARI and/or one or more operations for a performing device 114 to perform. For example, the ARI may be a string having an application specific scheme. The ARI may include a reference to a native application and indicate one or more operations for a performing device 114 (e.g., the native application) to perform. For example, the ARI may include the reference to the native application, a domain name, and a path to be used by the application to retrieve and display information to a user.

An example ARI for the native application OPENTABLE® by OpenTable Inc. (hereinafter, "OpenTable") on the ANDROID® OS is "vnd.opentable.deeplink://opentable.com/restaurant/profile?rid=88333&refid=1." A portion of the example ARI references OpenTable. For example, the substring "vnd.opentable.deeplink" of the ARI references OpenTable. The example ARI also indicates one or more operations for OpenTable to perform. For example, OpenTable may retrieve and display the information included in the ARI domain and path defined by the substring "opentable.com/restaurant/profile?rid=88333&refid=1." In response to receiving the ARI, a performing device 114 may launch OpenTable and display information retrieved from the location indicated by the ARI. The ARI may be provided by the developer of OpenTable in some examples.

In some examples, the AAM may include operations for the performing device 114 to perform in addition to the one or more operations indicated by the ARI. For example, an OS of the performing device 114 and/or a native application installed on the performing device 114 may perform these additional operations included in the AAM in order to set a native application into an application state specified by the AAM. In some examples, the operations may be included in a script. Examples of the operations may include, but are not limited to, launching a native application, waiting for the application to start, creating and sending a search request to a server, setting a current geo-location in a native application, making a restaurant reservation, sending a text message, and adding an appointment to a calendar. In some examples, an AAM may not include an ARI. Instead, the AAM can include other operations that reference a native application. The operations may be performed by a performing device 114. In some examples, the operations may be included in a script.

Referring back to FIG. 3, the search query 300 received by the search module 110 is used to perform a search of the data store 108. The query analysis module 302 receives the search query 300. The query analysis module 302 may perform various analysis operations on the received search query 300. For example, the analysis operations performed by the query analysis module 302 may include, but are not limited to, tokenization of the search query 300, filtering of the search query 300, stemming, synonymization, and stop word removal.

The set generation module 304 identifies a set of function records (i.e., the consideration set) included in the data store 108 based on the search query 300. In some examples, the set generation module 304 may identify the set of function records based on one or more matches between one or more terms of the search query 300 and one or more terms included in the function records. For example, the set generation module 304 may identify the set of function records based on one or more matches between one or more tokens generated by the query analysis module 302 and one or more words included in the function records of the set, such as words included in the ASI and/or function IDs of the function records. In some examples, the consideration set may include one or more function IDs of the identified function records used to identify the function records, rather than the function records themselves. As a result, the consideration set may include less data and/or require fewer processing and/or storage resources compared to techniques where the consideration set includes function records.

The set processing module 306 processes the consideration set to generate search results 308 that include one or more result objects. Each result object may include any of the data described above as being included in a result object. In some examples, the set processing module 306 scores the functions records included in the consideration set. The scores associated with the function records of the consideration set may be referred to as "result scores." Accordingly, in some examples, each of the function records included in the consideration set may have a corresponding result score. The set processing module 306 may then select one or more function records from the consideration set based on the result scores associated with the function records. For example, the set processing module 306 may select one or more highest-scoring function records of the consideration set.

The set processing module 306 generates one or more result objects based on the selected function records. For example, the set processing module 306 may generate a single result object based on a single function record. The set processing module 306 transmits the result objects to the smart watch device 112 that generated the search query 300. The set processing module 306 may also transmit the result scores associated with the result objects (i.e., with the function records used to generate the result objects) to the smart watch device 112.

The information conveyed by the search results 308 may depend on how the result scores are calculated by the set processing module 306. For example, the result scores may indicate the relevance of an application function, or application state, to the search query 300, the popularity of an application function, or application state, or other properties of the application function, or application state, depending on what parameters the set processing module 306 uses to score the function records of the consideration set.

The set processing module 306 may generate result scores for function records in a variety of different ways. In some implementations, the set processing module 306 generates a result score for a function record based on one or more scoring features. The scoring features may be associated with the function record and/or the search query 300. A function record scoring feature (hereinafter, a "record scoring feature") may be based on any data associated with a function record. For example, record scoring features may be based on any data included in ASI of a function record. A query scoring feature may include any data associated with the search query 300. For example, query scoring features may include, but are not limited to, a number of words in the search query 300, the popularity of the search query 300, and the expected frequency of the words in the search query 300. A record-query scoring feature may include any data which may be generated based on data associated with both a function record and the search query 300 that resulted in identification of the function record by the set generation module 304. For example, record-query scoring features may include, but are not limited to, parameters that indicate how well terms of the search query 300 match terms of ASI of an identified function record. In some examples, determining such record-query scoring features, i.e., parameters that indicate how well terms of a search query 300 match terms of ASI of an identified function record, may be performed using Lucene® information retrieval software developed by the Apache Software Foundation. The set processing module 306 may generate a result score for a function record based on at least one of the record scoring features, the query scoring features, and the record-query scoring features.

The set processing module 306 may determine a result score for a function record included in the consideration set based on one or more of the scoring features listed herein and/or additional scoring features not explicitly listed. In some examples, the set processing module 306 may include one or more machine-learned models (e.g., a supervised learning model) configured to receive one or more scoring features. The one or more machine-learned models may generate result scores for function records included in the consideration set based on at least one of the record scoring features, the query scoring features, and the record-query scoring features. For example, the set processing module 306 may pair the search query 300 with each function record included in the consideration set and calculate a vector of features for each (query, record) pair. The vector of features may include one or more record scoring features, one or more query scoring features, and one or more record-query scoring features. The set processing module 306 may then input the vector of features into a machine-learned regression model to calculate a result score for the corresponding function record. In some examples, the machine-learned regression model may include a set of decision trees (e.g., gradient boosted decision trees). In other examples, the machine-learned regression model may include a logistic probability formula. In some examples, the machine-learned task described above can be framed as a semi-supervised learning task, where a minority of the training data is labeled with human-curated scores, and the rest of the training data is used without human labels. The result scores associated with the function records of the consideration set may be used in a variety of different ways described herein.

FIGS. 5A-5D show example GUIs displayed on a smart watch device 500. Specifically, FIGS. 5A-5D depict an example GUI 504 of a search application executing on the smart watch device 500, example displayed results 510, 512, and 514 displayed on the smart watch device 500, and example user inputs configured to navigate through the displayed results 510, 512, and 514. The smart watch device 500 illustrated in FIGS. 5A-5D is a wrist watch computing device including watch straps 502, as described herein. Example wrist watch computing devices include the SAMSUNG GALAXY GEAR®, the SAMSUNG GALAXY GEAR® 2, the SAMSUNG GEAR® 2 Neo, and the SAMSUNG GEAR FIT® developed by Samsung Electronics Co., Ltd, as well as the APPLE WATCH® developed by Apple Inc.

Referring now to FIG. 5A, the smart watch device 500 executes the search application including the GUI 504. As shown in FIG. 5A, the GUI 504 displays a search field 506 for receiving search queries 300 from a user. Because the smart watch device 500 has a small form factor (e.g., a small display screen size), the smart watch device 500 may not include a full keyboard in some examples. Accordingly, the smart watch device 500 may receive search queries 300 in a different manner, such as using voice input. For example, the user may tap the search field 506 and speak into the smart watch device 500 in order to enter a search query 300 into the search field 506. The smart watch device 500 may then transmit the entered search query 300 to the search system 100. In some examples, the smart watch device 500 may automatically transmit the search query 300 after it has been received by the smart watch device 500. In other examples, the user may press a search button 508 also displayed by the GUI 504 in order to transmit the search query 300 to the search system 100.

In the example of FIG. 5A, the user has entered the search query "Steak" 300 into the search field 506. The smart watch device 500 has transmitted the search query 300 to the search system 100. The search system 100 has generated search results 308 in response to the search query 300. As illustrated in FIGS. 5B-5D, respectively, the search results 308 are associated with a mapping native application, a phone native application, and OpenTable. Each of the search results 308 (e.g., each of the result objects included in the search results 308) may be transmitted to the smart watch device 500 at the same time. Accordingly, although only a single one of the displayed results 510, 512, and 514 is shown at one time on the smart watch device 500 in each of FIGS. 5B-5D, the search results 308 that are not displayed (i.e., rendered as displayed results) may be stored in the memory of the smart watch device 500, or within a data store located outside of the smart watch device 500, for later retrieval. The user may interact with the smart watch device 500 (e.g., swipe a screen of a display of the smart watch device 500, or use a physical button of the smart watch device 500) to browse through the search results 308 (i.e., by individually rendering different ones of the search results 308 as displayed results). In some examples, as shown in FIG. 5B, the user may swipe from left to right on the display of the smart watch device 500 to advance through the displayed results. In these examples, the user may then swipe from right to left to back up, or move in an opposite direction, through the displayed results. The user swiping left or right on the display in this manner may cause the smart watch device 500 to advance through displayed results that are associated with a same native application, in some examples. In other examples, as shown in FIG. 5C, the user may swipe in an upward direction on the display of the smart watch device 500 to advance through the displayed results, and in a downward direction to move in an opposite direction through the displayed results. The user swiping upward or downward on the display in this manner may cause the smart watch device 500 to advance through displayed results that are associated with different native applications, in some examples.

FIG. 5B depicts the smart watch device 500 displaying the example displayed result 510 for the mapping native application on the smart watch device 500. The smart watch device 500 has generated the displayed result 510 for one of the search results 308 received from the search system 100. The displayed result 510 indicates to the user that selecting the displayed result 510 will result in a performing device 114 opening the mapping native application and navigating the user to the restaurant ALEXANDER'S STEAKHOUSE® by Alexander's Steakhouse Inc. (hereinafter, "Alexander's Steakhouse") that is located 5 miles away from the user's current location. The user may tap the displayed result 510 shown in FIG. 5B in order to select the displayed result 510. For example, the user may tap the user input graphic that includes the string "Navigate (Car)" in order to select the displayed result 510. In some examples, the displayed result 510 may be selected by tapping anywhere on the display of the smart watch device 500. In still other examples, the displayed result 510 may be selected by using a mechanical button of the smart watch device 500. The user may interact with (e.g., swipe the display of) the smart watch device 500 to introduce another displayed result to the display and remove the displayed result 510 of FIG. 5B from the display. For example, as described herein, the user may swipe left, right, upward, and/or downward to cause the smart watch device 500 to generate a different displayed result for another one of the search results 308 in place of the displayed result 512 shown in FIG. 5B.

FIG. 5C depicts the smart watch device 500 displaying the example displayed result 512 for the phone native application on the smart watch device 500. The smart watch device 500 has generated the displayed result 512 for another one of the search results 308 received from the search system 100. The displayed result 512 indicates to the user that selecting the displayed result 512 will result in a performing device 114 (e.g., a smart phone, or a car phone located near the user) opening the phone native application and setting it into an application state for calling Alexander's Steakhouse. The user may tap the displayed result 512 shown in FIG. 5C in order to select the displayed result 512. For example, the user may tap the user input graphic that includes the string "Call (Phone)" in order to select the displayed result 512. In some examples, the displayed result 512 may be selected by tapping anywhere on the display of the smart watch device 500, or using a mechanical button of the smart watch device 500. The user may interact with (e.g., swipe the display of) the smart watch device 500 to introduce another displayed result to the display and remove the displayed result 512 of FIG. 5C from the display. The user may also swipe the display to bring the displayed result 510 of FIG. 5B back on the display. For example, as described herein, the user may swipe left, right, upward, and/or downward to cause the smart watch device 500 to generate a different displayed result for another one of the search results 308 in place of the displayed result 512 shown in FIG. 5C.

FIG. 5D shows an example displayed result 514 for OpenTable, which is a restaurant reservation application. The displayed result 514 indicates to the user that selecting the displayed result 514 will result in a performing device 114 opening OpenTable (e.g., a native application, or a web-based application edition of the OpenTable application) to an entry for reserving a table at the "Osso Steakhouse." The user may tap the displayed result 514 shown in FIG. 5D to select the displayed result 514. For example, the user may tap the user input graphic that includes the string "Reserve Table (Tablet)" to select the displayed result 514. In some examples, the displayed result 514 may be selected by tapping anywhere on the display of the smart watch device 500, or using a mechanical button of the smart watch device 500. The user may interact with (e.g., swipe the display of) the smart watch device 500 to introduce another displayed result to the display and remove the displayed result 514 of FIG. 5D from the display. The user may also swipe the display one or more times to bring the displayed results 510 and 512 of FIGS. 5B and 5C back on the display.

In the examples of FIGS. 5B-5D, each of the displayed results 510, 512, and 514 indicates a performing device 114 that is configured to perform the function associated with the respective displayed result. In other words, each of the displayed results 510, 512, and 514 includes an indication of which performing device 114 will perform the function associated with the respective displayed result. For example, the displayed result 510 of FIG. 5B indicates that a first performing device 114 (e.g., a computing device installed in the user's car) will perform the above-described navigation function. The displayed result 512 indicates that a second performing device 114 (e.g., a smart phone) will perform the "Call" function also described above. Similarly, the displayed result 514 indicates that a third performing device 114 (e.g., a tablet) will perform the "Reserve Table" function also described above. In the example of FIG. 5D, the displayed result 514 further includes an indication of a communication interface (in this example, Bluetooth®, as indicated by the GUI element 516) by which the performing device 114 associated with displayed result 514 is communicatively coupled to the smart watch device 500. In other examples, one or more of the displayed results 510, 512, and 514 may each include other indications associated with the respective displayed result, the associated performing device 114, and/or other aspects or properties thereof.

FIGS. 6A-6C illustrate other example GUIs that may be generated on a smart watch device 600 including watch straps 602 according to the present disclosure. FIG. 6A shows the example smart watch device 600 receiving a search query 300 ("Flights") from a user of the smart watch device 600 (e.g., via a search field 606 of a GUI 604 of a search application executing on the smart watch device 600). The smart watch device 600 transmits the search query 300 to the search system 100 (e.g., upon the user selecting a search button 608 of the GUI 604) and receives search results 308 that are responsive to the search query 300 from the search system 100. FIG. 6B shows an example displayed result 610 (i.e., specifying an entry within Hipmunk for finding flights) on the smart watch device 600 that was received from the search system 100 in response to the search query 300. The user selects the displayed result 610 shown on the smart watch device 600 in FIG. 6B.

As described herein, in some examples, the smart watch device 600 may prompt the user to select a performing device 114. For example, after the user selects the displayed result 610 shown in FIG. 6B, the smart watch device 600 may display a GUI 612 that includes indications of one or more different possible performing devices 114, as illustrated in FIG. 6C. Specifically, as shown in FIG. 6C, the smart watch device 600 displays indications for three possible performing devices 114 within the GUI 612 for the user to choose. The three possible performing devices 114 indicated by the GUI 612 include a "Phone" (e.g., a smart phone), a "Tablet," and a "Laptop." The user may then select from the three possible performing devices 114 by interacting with the GUI 612 (e.g., by selecting a button, or GUI element corresponding to each performing device 114). In response to the user's selection of a particular one of the three possible performing devices 114 (e.g., the "Phone"), the smart watch device 600 may transmit an indication of the user's selection of the displayed result 610 on the smart watch device 600 (as shown in FIG. 6B) to the selected performing device 114.

As shown in FIG. 6C, the GUI 612 also includes a Bluetooth® logo 614 within the button, or GUI element corresponding to the "Phone" performing device 114. The Bluetooth® logo 614 may indicate that the smart watch device 600 is currently connected via Bluetooth® to a smart phone that can be used as a performing device 114 to perform a function associated with the selected result (i.e., the displayed result 610). Accordingly, in some examples, the smart watch device 600 can include graphical indicators that indicate whether any of the possible performing devices 114 are currently connected to the smart watch device 600.

FIGS. 7A-7D illustrate example GUIs that may be generated on a smart watch device 112 and a performing device 114 according to the present disclosure. In particular, FIGS. 7A-7B show a GUI 704 of a search application executing on a smart watch device 700 and an example displayed result 710 on the smart watch device 700. Additionally, FIGS. 7C-7D each show an example GUI of an application executing on one of performing devices 712 and 714. In the example of FIGS. 7A-7D, the smart watch device 700 is a wrist watch computing device including watch straps 702, as described herein. FIG. 7A shows that a user has entered a search query "Papa Johns" 300 into a search field 706 of the GUI 704 displayed on the smart watch device 700 to find search results 308 related to Papa John's® restaurants by Papa John's International, Inc. In this example, the user may have pressed a search button 708 of the GUI 704 to transmit the search query 300 to the search system 100. The single displayed result 710 generated using the search results 308 received from the search system 100 in response to the search query 300 is illustrated in FIG. 7B. The displayed result 710 of FIG. 7B illustrates that displayed results may include multiple different user inputs (e.g., "Navigate" and "Call" buttons) for selecting multiple different outcomes at one or more performing devices 114 from the smart watch device 700. For example, the user selecting the "Navigate (Car)" button may cause a performing device 114 installed in the user's car (e.g., a vehicle navigation system) to open a navigation native application and generate a route to the nearest "Papa John's®" restaurant. The user selecting the "Call (Phone)" button may cause a performing device 114 (e.g., the user's smart phone) to launch a phone native application and set the application into an application state that includes and/or dials the number for the nearest "Papa John's®" restaurant. The displayed result 710 shown in FIG. 7B also illustrates how displayed results may generate an indication of which performing device 114 will be performing a particular function associated with a given displayed result (e.g., a function associated with a specific button of the displayed result). For example, the displayed result 710 of FIG. 7B indicates that a first performing device 114 (e.g., a computing device installed in the user's car) will perform the above-described navigation function. The displayed result 710 also indicates that a second performing device 114 (e.g., a smart phone), different from the first performing device 114, will perform the "Call" function also described above.

As described herein, in some examples, the smart watch device 700 may automatically pick a performing device 114 for performing a function associated with a displayed result on the smart watch device 700 (e.g., upon the user selecting the displayed result). In other examples (e.g., FIG. 7B), the smart watch device 700 may indicate to the user which computing device will be used as the performing device 114 to perform the function. In still other examples, selection of the performing device 114 may be done in a different manner. For example, if a displayed result does not include an indication of the performing device 114, the smart watch device 112 may display a GUI including one or more performing devices 114 that each may be selected after the user selects the displayed result. In this example, the user may first select the displayed result that does not indicate a performing device 114, as described above. The smart watch device 112 may then update the display of the smart watch device 112 to display a GUI (e.g., in place of the displayed result) that allows the user to select the performing device 114 from among one or more performing devices 114. For example, the smart watch device 112 may update the display of the smart watch device 112 to show a list of multiple performing devices 114 (e.g., a car-based computing device, a phone computing device, a laptop computing device, and/or a desktop computing device) each of which may be selected by tapping a GUI element corresponding to the performing device 114. After the user selects the performing device 114, the smart watch device 112 may indicate to the selected performing device 114 that the user has selected the displayed result. In some examples, a name of a native application (e.g., "OpenTable") that will be launched when the user selects a displayed result may be displayed in the displayed result. In other examples, displayed results may not include names of one or more specific native applications, but may instead refer to functionality (e.g., "call," "navigate," etc.) of each displayed result in a more general manner.

FIG. 7C shows an example performing device 712 that has received an indication from the smart watch device 700 that the user has selected the "Navigate (Car)" button of the displayed result 710 shown in FIG. 7B. The performing device 712 illustrated in FIG. 7C is a vehicle navigation system. As shown in FIG. 7C, the vehicle navigation system (i.e., the performing device 712) has launched a navigation native application in response to receiving the indication from the smart watch device 700. As depicted in FIG. 7C, the navigation native application is providing directions to a nearby "Papa John's®" restaurant. FIG. 7D shows an example performing device 714 that has received an indication from the smart watch device 700 that the user has selected the "Call (Phone)" button of the displayed result 710 shown in FIG. 7B. The performing device 714 illustrated in FIG. 7D is a smart phone. As shown in FIG. 7D, the smart phone (i.e., the performing device 714) has launched a dialing native application in response to receiving the indication from the smart watch device 700. As depicted in FIG. 7C. the dialing native application is dialing a phone number for the nearby "Papa John's®" restaurant.

FIGS. 8A-12 are functional block diagrams that illustrate different arrangements of smart watch devices 112, performing devices 114, and the search system 100. The different arrangements are now described herein. FIGS. 8A-8B show examples in which a smart watch device 800, 804 and a performing device 802, 806 each have independent network access (i.e., via the network 106) to the search system 100. Put another way, the smart watch device 800, 804 is not tethered to the performing device 802, 806 in FIGS. 8A-8B. For example, with reference to FIG. 8A, the smart watch device 800 may communicate with the search system 100 using a Wi-Fi® connection, a cellular network connection, or other communication technology. The performing device 802 may also communicate with the search system 100 using a Wi-Fi® connection, a cellular network connection, or other communication technology. In some examples, the smart watch device 800 and the performing device 802 may communicate with the search system 100 using different communication technologies. In other examples, the smart watch device 800 and the performing device 802 may communicate with the search system 100 using the same communication technology. In some examples, the smart watch device 800 and the performing device 802 may be connected to the search system 100 through the same computing network (e.g., a home network, or a business network).

In some examples, the smart watch device 800 may transmit an indication (e.g., an indication that a user of the smart watch device 800 has selected a displayed result on the smart watch device 800) to the performing device 802 via the network 106, as shown in in the example of FIG. 8A. In other examples, the smart watch device 800 and the performing device 802 may communicate directly with one another, such as through a Bluetooth® connection, or other direct connection. In these examples, the smart watch device 800 may transmit the indication to the performing device 802 via the direct connection.

FIG. 8B illustrates the example smart watch device 804 and the example performing device 806. The smart watch device 804 is a wrist watch computing device, as described herein. The performing device 806 is a smart phone computing device. As shown in FIG. 8B, in some examples, the smart watch device 804 and the performing device 806 may each independently communicate with the search system 100. Additionally, in some examples, the smart watch device 804 may directly communicate with the performing device 806 (e.g., via a Bluetooth® connection).

Figure 9B:
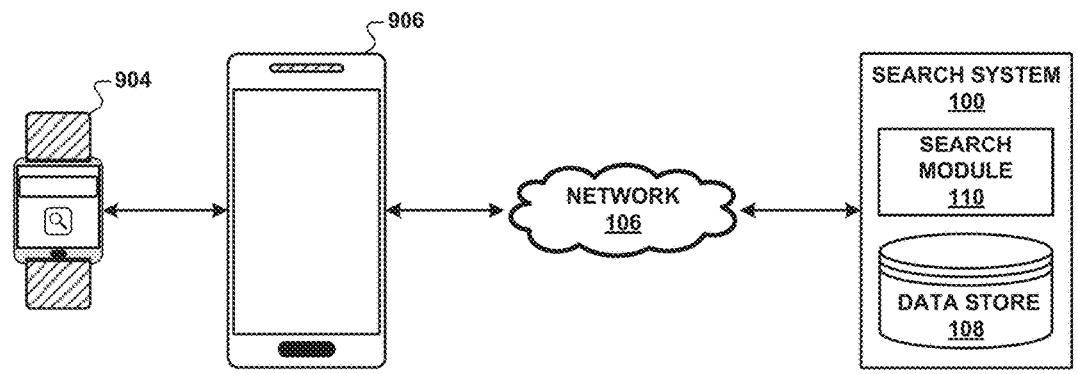
Figure 10:
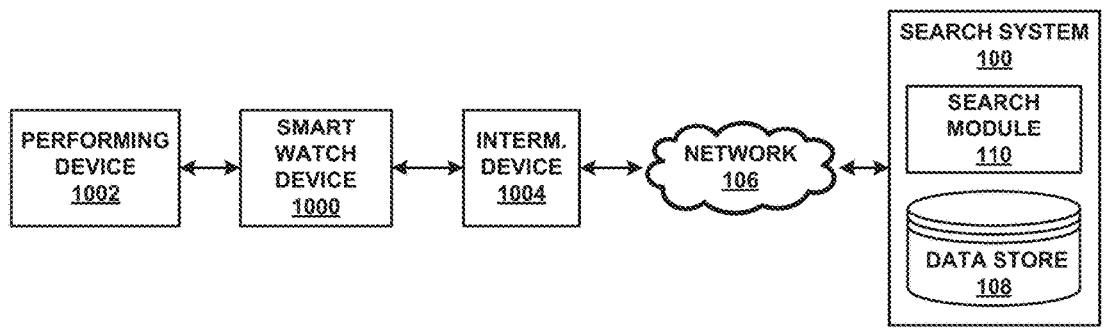
FIG. 10 illustrates an example arrangement of a smart watch device, a performing device, and an intermediate device in communication with a search system via a network.

FIGS. 9A-10 show example arrangements of computing devices in which a smart watch device 900, 904, 1000 is tethered to another computing device in order to communicate with the search system 100 (i.e., via the network 106). In FIG. 9A, the smart watch device 900 is tethered to a performing device 902. In this example, the smart watch device 900 may transmit search queries 300 to the search system 100 and receive search results 308 from the search system 100 via the performing device 902. The smart watch device 900 may be tethered to the performing device 902 because the smart watch device 900 may not have sufficient communication technology for communicating via the Internet with the search system 100. For example, the smart watch device 900 may have a communication technology (e.g., Bluetooth®) that cannot connect to the Internet at the current location of the smart watch device 900. In FIG. 9A, the smart watch device 900 may communicate directly with the performing device 902 via the tether. For example, if the smart watch device 900 is connected to the performing device 902 via a Bluetooth® connection, the smart watch device 900 may transmit an indication of a user selection of a displayed result (i.e., an indication of a selected result) to the performing device 902 using the Bluetooth® connection.

FIG. 9B illustrates the example smart watch device 904 and an example performing device 906. The example smart watch device 904 is a wrist watch computing device, as described herein. The example performing device 906 is a smart phone computing device. In the example of FIG. 9B, the wrist watch computing device (i.e., the smart watch device 904) is tethered to the smart phone computing device (i.e., the performing device 906). Accordingly, the wrist watch computing device communicates with the search system 100 via the smart phone computing device. The wrist watch computing device may be used by a user of the wrist watch computing device to view and select search results 308 (i.e., displayed results). The smart phone computing device may perform functions indicated by one or more displayed results that have been selected by the user on the wrist watch computing device (i.e., selected results).

FIG. 10 shows another example arrangement of computing devices in which the smart watch device 1000 is tethered to another computing device 1004, referred to herein as an "intermediate computing device," or an "intermediate device," in order to communicate with the search system 100. Accordingly, the smart watch device 1000 may communicate with the search system 100 via the intermediate device 1004. As described herein, the smart watch device 1000 indicates selected results to a performing device 1002, which is a different computing device than the intermediate device 1004. The smart watch device 1000 may indicate a selected result to the performing device 1002 via a direct connection in some examples (e.g., as shown in FIG. 10). In other examples, the smart watch device 1000 may communicate with the performing device 1002 via the Internet (e.g., in examples where the performing device 1002 is not tethered to the searching device 1000).

Figure 11:
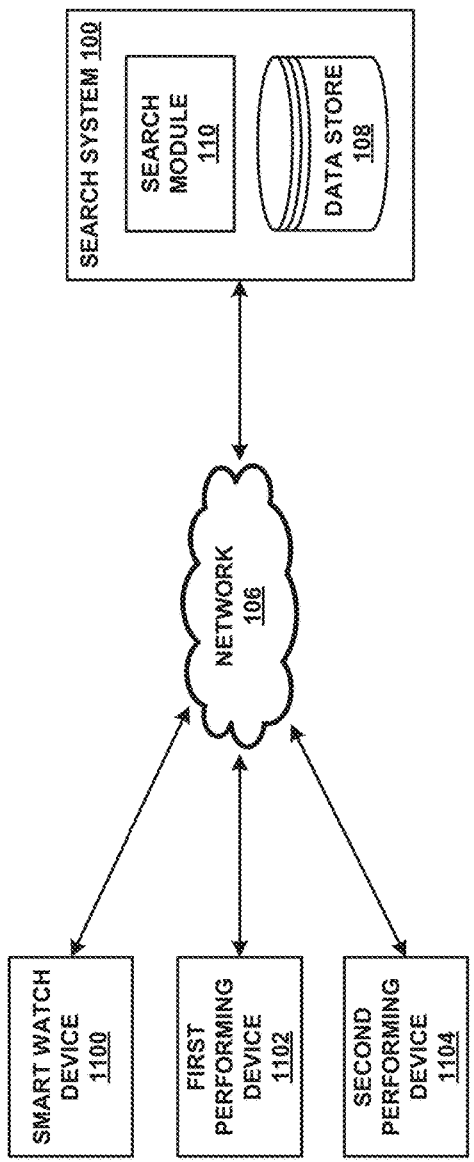
FIG. 11 illustrates an example arrangement of a smart watch device and multiple performing devices in communication with a search system via a network.
Figure 12:
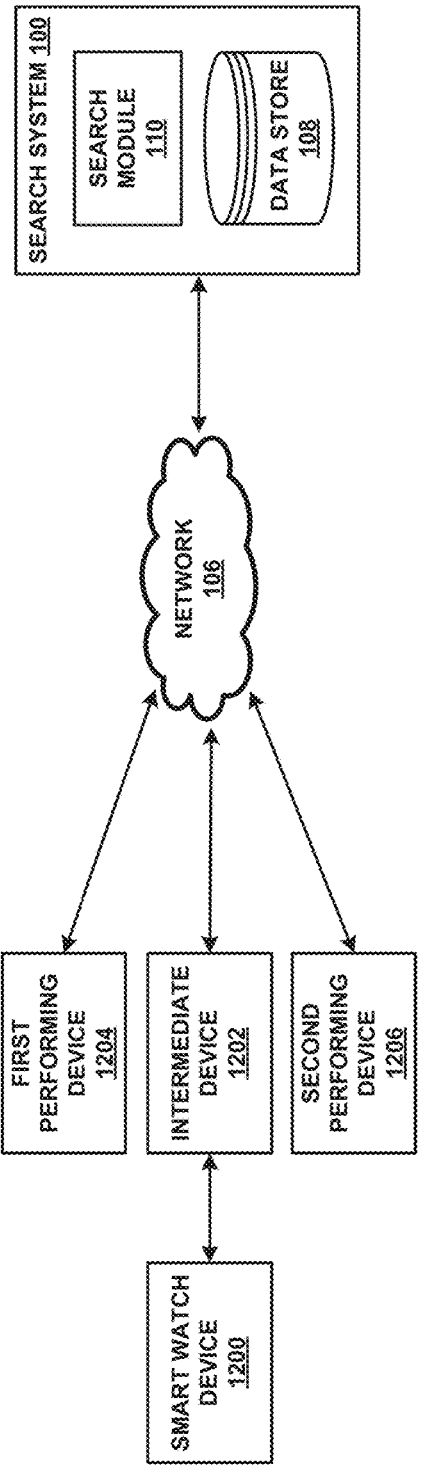
FIG. 12 illustrates an example arrangement of a smart watch device, an intermediate device, and multiple performing devices in communication with a search system via a network.

FIGS. 11-12 illustrate how a smart watch device 112 may transmit indications of selected results to each of multiple performing devices 114. With respect to FIG. 11, a smart watch device 1100 may indicate a selected result to a first performing device 1102 and/or a second performing device 1104. The performing device(s) (i.e., the one or more of the first and second performing devices 1102, 1104) that receive the indication may then perform one or more functions indicated by, or associated with, the indication. The connections between the smart watch device 1100 and the first and second performing devices 1102, 1104 may be direct connections and/or connections through a network (e.g., the network 106), such as the Internet. With respect to FIG. 12, a smart watch device 1200 is tethered to an intermediate computing device 1202 in order to communicate with the search system 100 (i.e., via the network 106). The smart watch device 1200 may indicate a selected result to a first performing device 1204 and/or a second performing device 1206. The performing device(s) (i.e., the one or more of the first and second performing devices 1204, 1206) that receive the indication may then perform one or more functions specified by the indication. The connections between the smart watch device 1200 and the first and second performing devices 1204, 1206 may be direct connections and/or connections through a network, e.g., the network 106 (via the intermediate computing device 1202), such as the Internet. In other examples, one or more of the first and second performing devices 1204, 1206 may be tethered to the smart watch device 1200. Additional arrangements of smart watch devices 112, performing devices 114, and intermediate devices are also contemplated herein in view of the above-described examples.

FIG. 13 is a flow diagram that illustrates an example method 1300 for generating search results 308 based on a received search query 300. The method 1300 is described with respect to the search module 110 of FIG. 3 and the various components thereof.

In block 1302, the query analysis module 302 receives a search query 300 from (e.g., generated by) a smart watch device 112. For example, the smart watch device 112 may have received the search query 300 from a user of the smart watch device 112 (e.g., via a GUI of a search application executing on the smart watch device 112) and transmitted the search query 300 to the query analysis module 302 (i.e., to the search system 100). In block 1304, the query analysis module 302 performs an analysis of the search query 300. For example, the query analysis module 302 may perform any of tokenization, filtering, stemming, synonymization, and stop word removal with respect to the search query 300. In block 1306, the set generation module 304 identifies a consideration set of one or more function records included in the data store 108 using the search query 300 (e.g., based on an output from the query analysis module 302). For example, the set generation module 304 may identify the function records of the consideration set based on one or more matches between one or more terms of the search query 300 and one or more terms included in ASI and/or a function ID of each function record.

In blocks 1308-1310, the set processing module 306 processes the consideration set. For example, in block 1308, the set processing module 306 generates one or more result scores for the function records included in the consideration set. In block 1310, the set processing module 306 selects one or more function records from the consideration set based on the result scores associated with the function records. For example, the set processing module 306 may select one or more function records having the highest (e.g., largest) one or more result scores from the consideration set. In block 1312, the set processing module 306 generates one or more result objects based on the selected function records. In block 1314, the set processing module 306 transmits the result objects to the smart watch device 112 (i.e, as the search results 308).

FIG. 14 is a flow diagram that illustrates an example method 1400 describing operation of a smart watch device 112 according to the present disclosure. In block 1402, the smart watch device 112 receives a search query 300 from a user of the smart watch device 112. For example, the smart watch device 112 may have received the search query 300 from the user via a GUI of a search application executing on the smart watch device 112. In block 1404, the smart watch device 112 transmits the received search query 300 to the search system 100. In block 1406, the smart watch device 112 waits to receive one or more search results 308 from the search system 100 in response to transmitting the search query 300. In block 1408, upon receiving the search results 308 from the search system 100, the smart watch device 112 displays (e.g., via the search application) a single one (i.e., only one) of the received search results 308 (e.g., generates a single displayed result based on one of the received search results 308) to the user. In block 1410, the smart watch device 112 waits for the user to select the single displayed result. In block 1412, upon detecting (e.g., via the search application) a selection of the single displayed result by the user, the smart watch device 112 transmits an indication of the selected result to a performing device 114.

FIG. 15 is a flow diagram that illustrates an example method 1500 describing operation of a performing device 114 according to the present disclosure. In block 1502, the performing device 114 receives an indication of a selected result from a smart watch device 112. In other words, the performing device 114 receives an indication of a search result 308 that has been selected by a user of the smart watch device 112 on the smart watch device 112. The indication may include a variety of different types of data. For example, the indication may include one or more access mechanisms. In some examples, the indication may include on or more AAMs. Additionally, or alternatively, the indication may include a WAM. In some examples, the indication may include an application download address, e.g., along with the AAM(s) in cases where a native application referenced by the AAM(s) is not available on the performing device 114. In other examples, the indication may reference, rather than include, one or more of the AAM(s), WAM, and application download address described above. In still other examples, the indication may include one or more instructions or commands for the performing device 114, as described herein.

In block 1504, the performing device 114 selects an access mechanism using the indication received from the smart watch device 112. For example, the performing device 114 may select an AAM (e.g., from the indication itself, or using the indication as a reference) if the performing device 114 has a native application that is referenced by the AAM installed on the performing device 114. In another example, the performing device 114 may select a WAM (e.g., from the indication itself, or using the indication as a reference) if the performing device 114 does not have a native application that will handle an AAM included in, or referenced by, the indication installed on the performing device 114. In still other examples, if the indication includes, or references, an application download address, the performing device 114 may be directed to a download site or other location (e.g., a digital distribution platform) where the performing device 114 can download a native application. In these examples, the native application may be referenced by an AAM also included in, or referenced by, the indication.

In block 1506, the performing device 114 performs a function according to the selected access mechanism. For example, if the selected access mechanism is an AAM, the performing device 114 may launch a native application referenced by the AAM and set the native application into an application state specified by the AAM. Alternatively, if the selected access mechanism is a WAM, the performing device 114 may launch a web browser application installed on the performing device 114 and perform a function specified by the WAM (e.g., access a web resource using a URL included in the WAM).

As described herein, in some examples, upon receiving an indication of a selected result from the smart watch device 112, instead of launching a native application and setting it into an application state, or launching a web browser and accessing a web resource, the performing device 114 can show an expanded view of the selected result (e.g., a view that includes more image/text content, or detail, and/or GUI input/output options). This may be beneficial in scenarios where the user would like to view the selected result on a larger screen, assuming that the smart watch device 112 has a relatively smaller display screen size and that the performing device 114 (e.g., a smart phone, or a tablet) has a relatively larger display screen size.

FIGS. 16A-16C show an example in which a user selects a displayed result 1604 on a smart watch device 1600 (FIG.

16A), which results in a performing device 1610 displaying an expanded view 1612 of the selected result (FIG. 16B), or performing a function indicated by the selected result (FIG. 16C). Specifically, with respect to FIG. 16A, the user selects the displayed result 1604 (i.e., a search result 308 that directs the performing device 1610 to find hotels within the native application HIPMUNK® by Hipmunk Inc. (hereinafter, "Hipmunk")) on the smart watch device 1600. In the example of FIG. 16A, to select the displayed result 1604, the user may select one of a search result performance GUI element 1606 and a search result expansion GUI element 1608 included in the displayed result 1604. In this example, upon the user selecting the GUI element 1606, the smart watch device 1600 indicates to the performing device 1610 that the performing device 1610 should perform a function indicated by the selected result, as described with reference to FIG. 16C. Alternatively, upon the user selecting the GUI element 1608, the smart watch device 1600 indicates to the performing device 1610 that the performing device 1610 should display (e.g., launch) an expanded view of the selected result, as described with reference to FIG. 16B. In this example, the user may interact with the expanded view (e.g., enter one or more parameters into the expanded view), or simply view the expanded view. The user may also select the expanded view to cause the performing device 1610 to perform the function indicated by the selected result, as described with reference to FIG. 16C (e.g., based on one or more user inputs specified by the user via interacting with the expanded view).

As shown in FIG. 16B, in response to receiving the indication that the performing device 1610 should display an expanded view of the selected result (i.e., the displayed result 1604) from the smart watch device 1600, the performing device 1610 displays an example expanded view 1612 of the selected result on the performing device 1610. As shown in FIG. 16B, the expanded view 1612 includes additional content, details, and GUI input options compared to the displayed result 1604. Specifically, the expanded view 1612 includes a field for entering an address, a calendar date, a number of rooms, and a number of people for the rooms, thereby enabling the user to specify these parameters as part of the user's search for hotels using Hipmunk. As described herein, the user may view the expanded view 1612 and interact with the expanded view 1612 in order to launch Hipmunk on the performing device 1610. For example, the user may enter an address, a date, a number of rooms, and a number of people into input fields provided in the expanded view 1612. In the example of FIG. 16B, the user has entered an address "278 Castro St., Mountain View, Calif. 94.," a date range of "February 19-February 20," a number of rooms "1," and a number of people "2" into the input fields. The user may then tap a "Search Hotels" button of the expanded view 1612. The user tapping the "Search Hotels" button may cause the performing device 1610 to launch Hipmunk, which is installed on the performing device 1610, and set Hipmunk into an application state that shows one or more hotels located in Mountain View, Calif., which are available for the dates of February 19-20, and that can accommodate 2 persons in 1 room, as illustrated in FIG. 16C. In other examples, the expanded view 1612 may not include any GUI input options. In these examples, the user may view the expanded view 1612 and select it to launch Hipmunk and set Hipmunk into the application state indicated by the selected result without first interacting with the expanded view 1612 in the manner described above. For example, the user may tap the "Search Hotels" button of the expanded view 1612 to cause the performing device 1610 to launch Hipmunk and set it into the application state, as illustrated in FIG. 16C. Alternatively, as shown in FIG. 16C, in response to receiving the indication that the performing device 1610 should perform the function indicated by the selected result from the smart watch device 1600, the performing device 1610 directly launches Hipmunk on the performing device 1610 and displays a GUI, or screen, 1614 of the application state within Hipmunk specified by the selected result.

In some examples (not shown in FIGS. 16A-16C), the smart watch device 1600 may automatically (e.g., without additional user input, such as user selections of any of the GUI elements 1606 and 1608) indicate to the performing device 1610 that an expanded view of the selected result should be shown on the performing device 1610. In other examples (also not shown in FIGS. 16A-16C), the smart watch device 1600 may prompt the user to select whether an expanded view of the selected result should be shown on the performing device 1610, or whether the performing device 1610 should launch a native application (e.g., Hipmunk) and set the application into an application state using the selected result. For example, after the user selects a displayed result (e.g., the displayed result 1604) on the smart watch device 1600, the smart watch device 1600 may display a button, or another GUI input element, that includes the string "Show expanded view" or "Launch app." In this manner, the button or GUI input element may enable the user to select whether the performing device 1610 should display an expanded view of the selected result, or launch a native application (e.g., Hipmunk) referenced by the selected result and set the application into an application state specified by the selected result. If the user selects the button or GUI input element that includes the string "Show expanded view," the smart watch device 1600 may transmit an indication to the performing device 1610 to show an expanded view (e.g., the expanded view 1612) of the selected result, as shown in FIG. 16B. If the user selects the button or GUI input element that includes the string "Launch app," the smart watch device 1600 may transmit an indication to the performing device 1610 to launch the native application according to the selected result, as shown in FIG. 16C. In this example, the performing device 1610 may launch the native application and set the application into an application state specified by the selected result, as described herein.

In some examples, the smart watch device 112 may store search results 308 for later retrieval and use (e.g., based on a user input, or other considerations). For example, the smart watch device 112 may perform a search of the data store 108 using a search query 300, generate search results 308 as a result of performing the search, and store the search results 308 within the smart watch device 112 and/or an external data store. In this example, a user of the smart watch device 112 may (e.g., using a user input) cause the smart watch device 112 to recall one or more of the stored search results 308, and display a single one of the recalled stored search results 308 on the smart watch device 112 at any given time. The user may then select a particular displayed stored search result 308 to cause a performing device 114 to perform a function indicated by the selected stored search result 308. In these examples, the smart watch device 112 may store the search results 308 so that the user can easily retrieve the stored search results 308 at a later time for viewing and/or selection, as described above. Storing the search results 308 on the smart watch device 112, or the external data store, in this manner may save the user time that would otherwise be spent performing a new search for the search results 308.

In some examples, the smart watch device 112 may present an option (e.g., a GUI element, such as a button, including the string "Store result") to the user to store a displayed result as a stored search result 308. In other examples, the user may perform an action to store a displayed result within the smart watch device 112 and/or the external data store, such as pressing one or more GUI elements, or buttons, or performing a gesture at the display of the smart watch device 112. In some examples, the smart watch device 112 may automatically store some or all of the search results 308. For example, the smart watch device 112 may maintain a history of (i.e., store) one or more previously selected results (i.e., selected displayed results).

A stored search result 308 may include some or all of the result object data associated with a search result 308, such that, upon selection of the stored search result 308, the smart watch device 112 can indicate to a performing device 114 to perform a function associated with the stored search result 308, and the performing device 114 is able to perform the function. In some examples, stored search results 308 may be stored on computing devices other than the smart watch device 112 (e.g., the performing device 114), as described herein. In other examples, the smart watch device 112 can transfer the stored search results 308 to one or more other computing devices (e.g., the performing device 114, or another computing device).

As described above, in some scenarios, there may be multiple possible performing devices 114 that may each be used to perform a function indicated by a particular selected result. In some examples, the smart watch device 112 may rank the multiple performing devices 114 for consideration. For example, the smart watch device 112 may rank the multiple performing devices 114 based on a variety of different considerations. Example ranking considerations may include, but are not limited to, physical proximity of each performing device 114 to the smart watch device 112, whether and/or how often the performing device 114 has been selected in the past, whether the performing device 114 has a native application capable of providing access to the chosen function (e.g., the selected result), whether the smart watch device 112 has recently sent (e.g., within seconds) an indication to the performing device 114 (e.g., rendering the performing device 114 unable to accept other indications from the smart watch device 112), and whether the performing device 114 is currently executing an application. In some examples, the smart watch device 112 can automatically select a performing device 114 from the multiple performing devices 114 based on the ranking (e.g., select a highest-ranked performing device 114). In other examples, the smart watch device 112 can display to the user a menu that includes a list of the multiple performing devices 114 arranged based on their rankings. In this example, the user can select a performing device 114 from the list.

As described herein, the user may select a search result 308 displayed on the smart watch device 112 (i.e., a displayed result), which then causes another computing device (e.g., a performing device 114) to perform one or more actions (e.g., a function) defined by the selected result. In some examples, the smart watch device 112 may be configured to allow the user to continue looking at one or more other displayed results (i.e., one displayed result at a time) after selecting the displayed result on the smart watch device 112. In these examples, the user may continue to browse through the displayed results while the performing device 114 is performing the function indicated by the selected result. As the user browses through the displayed results, the user may select another one of the displayed results. In these examples, the smart watch device 112 may indicate to the performing device 114 to perform a function according to the other selected result. As a result, the performing device 114 may perform the function according to the other selected result. In other examples, the smart watch device 112 may transmit the indication of the other selected result to another performing device 114.

Figure 17:
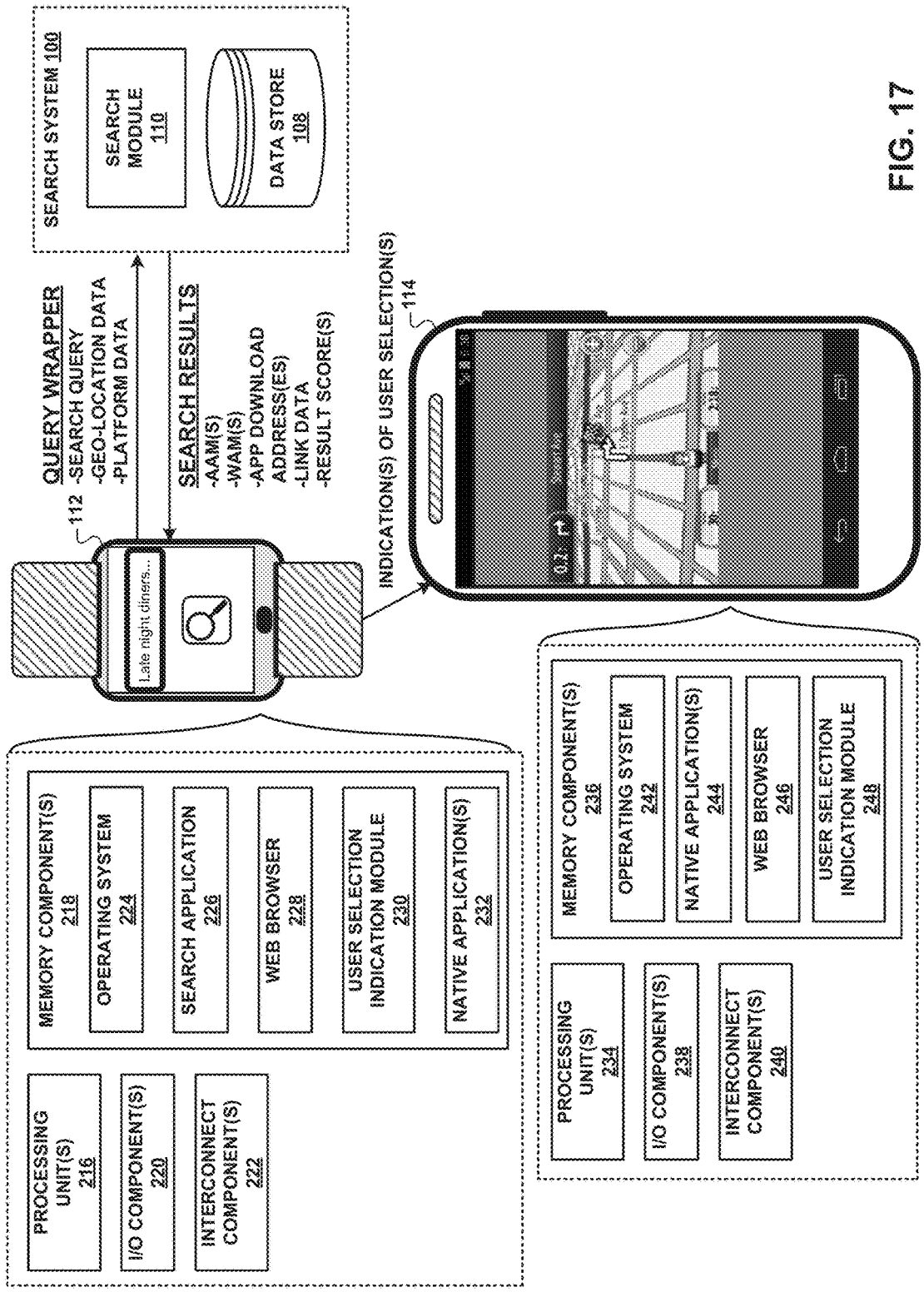
FIG. 17 is a functional block diagram of an example smart watch device and an example performing device in communication with a search system.

FIG. 17 is a functional block diagram of an example smart watch device 112 and an example performing device 114 in communication with the search system 100 according to the techniques of the present disclosure. As shown in FIG. 17, the smart watch device 112 includes one or more processing units 216, one or more memory components 218, one or more input/output (I/O) components 220, and one or more interconnect components 222. The memory component(s) 218 store an OS 224, a search application 226, a web browser application 228, a user selection indication module 230, and one or more native applications 232 (e.g., native applications installed on the smart watch device 112). As also shown in FIG. 17, the performing device 114 includes one or more processing units 234, one or more memory components 236, one or more I/O components 238, and one or more interconnect components 240. The memory component(s) 236 store an OS 242, one or more native applications 244 (e.g., native applications installed on the performing device 114), a web browser application 246, and a user selection indication module 248.

Each of the processing unit(s) 216, 234 may be configured to execute instructions stored in the corresponding ones of the memory component(s) 218, 236 and communicate with the corresponding ones of the memory component(s) 218, 236 and I/O component(s) 220, 238 (e.g., via the corresponding ones of the interconnect component(s) 222, 240). Each of the OS 224, 242, search application 226, web browser application 228, 246, user selection indication module 230, 248, and native application(s) 232, 244 may be embodied in computer-executable instructions and executed by the corresponding one of the processing unit(s) 216, 234. The memory component(s) 218, 236 may be configured to store executable instructions, system parameters, and other data in addition to the contents described above. Each of the I/O component(s) 220, 238 may be configured to (e.g., at the direction of the corresponding ones of the processing unit(s) 216, 234) receive inputs to the corresponding one of the smart watch and performing devices 112, 114 and transmit outputs from corresponding one of the devices 112, 114. The interconnect component(s) 222, 240 may be configured to provide communication between the corresponding ones of the processing unit(s) 216, 234, memory component(s) 218, 236, and I/O component(s) 220, 238, as well as among other devices.

The units, components, and modules of the smart watch and performing devices 112, 114 described above may enable each of the devices 112, 114 to perform the techniques attributed to the device according to this disclosure. For example, the smart watch device 112 (e.g., the processing unit(s) 216 executing instructions stored in the memory component(s) 218) may be configured to receive (e.g., via the I/O component(s) 220) a search query 300 from a user, transmit (e.g., via the I/O component(s) 220) the search query 300 to the search system 100, and receive (e.g., via the I/O component(s) 220) search results 308 that are responsive to the search query 300 from the search system 100. The smart watch device 112 may be further configured to display (e.g., via the I/O component(s) 220) a single one of the search results 308 to a user of the smart watch device 112. The smart watch device 112 may also be configured to receive (e.g., via the I/O component(s) 220) a selection of the single displayed result from the user, and transmit (e.g., via the L/O component(s) 220) an indication of the selection to the performing device 114.

To perform one or more of receiving the search query 300, transmitting the search query 300, receiving the search results 308, displaying the single search result 308, receiving the selection of the single displayed result, and transmitting the indication of the selection, the processing unit(s) 216 may execute one or more instructions included in the memory component(s) 218. For example, the processing unit(s) 216 may execute instructions associated with one or more of the OS 224, search application 226, web browser application 228, user selection indication module 230, and native application(s) 232. In a specific example, the processing unit(s) 216 may execute instructions that cause the smart watch device 112 to run the OS 224. To receive the search query 300, transmit the search query 300, receive the search results 308, display the single search result 308, receive the selection of the single displayed result, and transmit the indication of the selection, the processing unit(s) 216 may further execute instructions that cause the smart watch device 112 to run the search application 226 or web browser application 228 within the OS 224. In some examples, to transmit the indication, the processing unit(s) 216 may execute instructions that cause the smart watch device 112 to run the user selection indication module 230. The user selection indication module 230 may be a dedicated software module configured to transmit indications of user selections of search results 308 on the smart watch device 112 to the performing device 114.

The performing device 114 (e.g., the processing unit(s) 234 executing instructions stored in the memory component(s) 236) may be configured to receive (e.g., via the I/O component(s) 238) the indication and perform a function indicated by the selected result 308 in response to receiving the indication. To perform one or more of receiving the indication and performing the function, the processing unit(s) 234 may execute one or more instructions included in the memory component(s) 236. For example, the processing unit(s) 234 may execute instructions associated with one or more of the OS 242, native application(s) 244, web browser application 246, and user selection indication module 248. In a specific example, the processing unit(s) 234 may execute instructions that cause the performing device 114 to run the OS 242. To receive the indication, the processing unit(s) 234 may further execute instructions that cause the performing device 114 to run the user selection indication module 248 within the OS 242. The user selection indication module 248 may be a dedicated software module configured to receive indications of user selections of individual search results 308 on the smart watch device 112 at the performing device 114. To perform the function, the processing unit(s) 234 may execute instructions that cause the performing device 114 to run the native application(s) 244 or web browser application 246 within the OS 242.

The modules and data stores included in the search system 100 represent features that may be included in the search system 100 of the present disclosure. For example, the search module 110, query analysis module 302, set generation module 304, set processing module 306, and data store 108 may represent features included in the search system 100. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common or separate electronic hardware and software components.

The modules and data stores may be embodied by electronic hardware and software components including, but not limited to, one or more processing units, one or more memory components, one or more input/output (I/O) components, and interconnect components. The interconnect components may be configured to provide communication between the one or more processing units, one or more memory components, and one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with the one or more memory components and I/O components. For example, the one or more processing units may be configured to communicate with the one or more memory components and I/O components via the interconnect components.

A memory component, or memory, of the present disclosure may include any volatile or non-volatile media. For example, the memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc (CD), digital versatile disc (DVD), and/or Blu-ray Disc), or any other memory components.

The one or more memory components may include (e.g., store) data described herein. For example, the one or more memory components may include the data included in the function records of the data store 108. The one or more memory components may also include instructions that may be executed by the one or more processing units. For example, the one or more memory components may include computer-readable instructions that, when executed by the one or more processing units, cause the processing units to perform the various functions attributed to the modules and data stores described herein.

The one or more I/O components may refer to electronic hardware and software that provides communication with a variety of different devices. For example, the one or more I/O components may provide communication between other devices and the one or more processing units and memory components. In some examples, the one or more I/O components may be configured to communicate with a computer network. For example, the one or more I/O components may be configured to exchange data over a computer network using a variety of different physical connections, wireless connections, and protocols. The one or more I/O components may include, but are not limited to, network interface components (e.g., a network interface controller), repeaters, network bridges, network switches, routers, and firewalls. In some examples, the one or more I/O components may include hardware and software that is configured to communicate with various human interface devices, including, but not limited to, display screens, keyboards, pointer devices (e.g., a mouse), touchscreens, speakers, and microphones. In some examples, the one or more I/O components may include hardware and software that is configured to communicate with additional devices, such as external memory (e.g., external HDDs).

In some implementations, the search system 100 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of the processing units, memory components, I/O components, and interconnect components described above. The one or more computing devices may also include various human interface devices, including, but not limited to, display screens, keyboards, pointing devices (e.g., a mouse), touchscreens, speakers, and microphones. The one or more computing devices may also be configured to communicate with additional devices, such as external memory (e.g., external HDDs).

The one or more computing devices of the search system 100 may be configured to communicate with the network 106. The one or more computing devices may also be configured to communicate with one another via a computer network. In some examples, the one or more computing devices may include one or more server computing devices configured to communicate with user devices (e.g., receive search queries 300 and transmit search results 308), gather data from data sources, index the data, store the data, and/or store other documents. The one or more computing devices may reside within a single machine at a single geographic location, within multiple machines at a single geographic location, or be distributed across a number of geographic locations.

Additionally, the various implementations of the search system 100 described above (e.g., using one or more computing devices that include one or more processing units, memory components, I/O components, and interconnect components) are equally applicable to any of the smart watch device 112 and the performing device(s) 114.

What is claimed is:

1. A smart watch device comprising:
    a wrist watch housing configured to be worn around a user's wrist;
    a computing device included in the wrist watch housing; and
    a display device included in the wrist watch housing and communicatively coupled to the computing device,
    wherein the computing device is configured to:
        transmit a search query to a search system, wherein the search query includes at least one character;
        receive one or more search results corresponding to the search query from the search system in response to transmitting the search query;
        display the one or more search results using the display device, wherein the one or more search results comprise an application list of executable functions and one or more external devices;
        receive an input for a user selection of one search result of the one or more search results; and
        in response to the input for the user selection, transmit an indication of the user selection to a selected performing external device, wherein the selected external device is configured to initiate an attempt to launch an application corresponding to the selected search result in response to receiving the indication.

2. The smart watch device of claim 1,
    wherein the selected search result includes an access mechanism, and
    wherein, to execute a function of the selected search result, the selected external device is configured to set the application into a state of the application using the access mechanism.

3. The smart watch device of claim 1, wherein the computing device is further configured to display only one of the one or more search results, detect a user input configured to cause the computing device to navigate through the one or more search results, and display a different search result of the one or more search results in response to detecting the user input.

4. The smart watch device of claim 3,
    wherein the selected search result is associated with the application,
    wherein, to detect the user input, the computing device is further configured to detect one of a right swiping gesture or a left swiping gesture at the display device, and
    wherein, to display the different search result, the computing device is further configured to display the one of the one or more search results that is associated with the application.

5. The smart watch device of claim 3,
    wherein the one of the one or more search results is associated with a first application,
    wherein, to detect the user input, the computing device is further configured to detect one of an upward swiping gesture or a downward swiping gesture at the display device, and
    wherein to display the different one of the one or more search results, the computing device is further configured to display the one of the one or more search results that is associated with a second application which is different than the first application.

6. The smart watch device of claim 1, wherein the computing device is further configured to:
    store the one or more search results within one or more of the smart watch device or a data store located outside of the smart watch device;
    receive a user input configured to cause the computing device to display the stored one or more search results using the display device; and
    display only one of the stored one or more search results using the display device in response to receiving the user input.

7. The smart watch device of claim 6,
    wherein the user input comprises a first user input, and
    wherein the computing device is further configured to detect a second user input configured to cause the computing device to navigate through the stored one or more search results, and display a different only one of the stored one or more search results using the display device in response to detecting the second user input.

8. The smart watch device of claim 1, wherein the computing device is further configured to display an indication of the selected external device using the display device.

9. The smart watch device of claim 8, wherein the computing device is further configured to display an indication of each of one or more of the following using the display device:
- whether the selected external device is communicatively coupled to the computing device;
- whether the selected external device has been previously communicatively coupled to the computing device;
- a communication interface by which the selected external device is communicatively coupled to the computing device;
- a location of the selected external device; or
- an availability of the selected external device to execute a function of the selected search result.

10. The smart watch device of claim 1, wherein to transmit the indication of the user selection to the selected external device, the computing device is further configured to:
- display, in the application list, an indication of each of the one or more external devices including the selected external device using the display device;
- receive an input for a user selection of one of the one or more indications that corresponds to the selected external device; or
- select the external device from among the one or more external devices in response to receiving the input for the user selection of the one of the one or more indications that corresponds to the selected external device.

11. The smart watch device of claim 10, wherein each of the one or more external devices is capable of executing a function indicated by the one of the one or more search results in response to receiving the indication and one or more of an external device that is communicatively coupled to the computing device, an external device that has been previously communicatively coupled to the computing device, an external device that is located proximate to the computing device, or an external device that is available to execute a function of the selected search result.

12. The smart watch device of claim 10, wherein the computing device is further configured to display an indication of each of one or more of the following using the display device:
- whether at least one of the one or more external devices is communicatively coupled to the computing device;
- whether at least one of the one or more external devices has been previously communicatively coupled to the computing device;
- a communication interface by which at least one of the one or more external devices is communicatively coupled to the computing device;
- a location of at least one of the one or more external devices; or
- an availability of at least one of the one or more external devices to execute a function of the selected search result.

13. The smart watch device of claim 10, wherein the computing device is further configured to display the one or more indications using the display device along with the one of the one or more search results corresponding to the search query displayed using the display device.

14. The smart watch device of claim 10,
wherein the computing device is further configured to display the one or more indications using the display device after receiving the input for the user selection of the one of the one or more search results, and
wherein the computing device is further configured to display the one or more indications in place of the one of the one or more search results using the display device.

15. The smart watch device of claim 10, wherein to display the one or more indications of the one or more external devices using the display device, the computing device is further configured to arrange at least one of the one or more indications based on one or more of:
- whether the corresponding one of the one or more external devices is communicatively coupled to the computing device;
- whether the corresponding one of the one or more external devices has been previously communicatively coupled to the computing device;
- whether the corresponding one of the one or more external devices is located proximate to the computing device;
- whether the corresponding one of the one or more external devices is available to execute a function of the selected search result;
- a number of times the corresponding one of the one or more external devices has been previously selected; or
- how frequently the corresponding one of the one or more external devices has been selected.

16. The smart watch device of claim 1,
wherein the one of the one or more search results indicates multiple functions and includes multiple graphical elements that each indicate a different one of the multiple functions,
wherein, to receive the input for the user selection of the one of the one or more search results, the computing device is further configured to receive an input for a user selection of one of the multiple graphical elements,
wherein the indication of the user selection of the one of the one or more search results comprises an indication of the user selection of the one of the multiple graphical elements, and
wherein the selected external device is configured to execute one of the multiple functions indicated by the one of the multiple graphical elements in response to receiving the indication of the user selection of the one of the multiple graphical elements.

17. The smart watch device of claim 16, wherein at least one of the multiple graphical elements further indicates one or more of:
- an external device that is configured to execute the one of the multiple functions associated with the graphical element;
- whether the external device is communicatively coupled to the computing device;
- whether the external device has been previously communicatively coupled to the computing device;
- a communication interface by which the external device is communicatively coupled to the computing device;
- a location of the external device; or
- an availability of the external device to execute the one of the multiple functions.

18. The smart watch device of claim 1,
wherein the computing device is further configured to detect a user input,
wherein the user input is configured to cause the selected external device to display an expanded version of the one of the search results, and transmit an indication of the user input to the external device, and wherein, to execute a function indicated by the one of the search results, the external device is configured to display the expanded version of the one of the search results in response to receiving the user input, receive an input for a user selection of the expanded version of the one of the search results, and execute the function indicated by the one of the search results in response to receiving the input for the user selection of the expanded version of the one of the search results.

19. A method comprising:

transmitting, using a smart watch device, a search query to a search system configured to generate search results in response to receiving the search query, wherein the search query includes at least one character;

receiving one or more search results corresponding to the search query from the search system in response to transmitting the search query at the smart watch device;

displaying the one or more search results at the smart watch device, wherein the one or more search results comprise an application list of executable functions and one or more external devices;

receiving, using the smart watch device, an input for a user selection of a search result of the one or more search results; and in response to the input for the user selection, transmitting, using the smart watch device, an indication of the user selection to a selected external device, wherein the selected external device is configured to initiate an attempt to launch an application corresponding to the selected search result in response to receiving the indication.

20. A non-transitory computer-readable storage medium comprising instructions that cause one or more computing devices to:

transmit, using a smart watch device, a search query to a search system, wherein the search query includes at least one character;

receive one or more search results corresponding to the search query from the search system in response to transmitting the search query;

display the one or more search results at the smart watch device, wherein the one or more search results comprise an application list of executable functions and one or more external devices;

receive, using the smart watch device, an input for a user selection of a search result of the one or more search results; and in response to the user selection, transmit, using the smart watch device, an indication of the user selection to a selected external device, wherein the selected external device is configured to initiate an attempt to launch an application corresponding to the selected search result in response to receiving the indication.

* * * * *